(12) United States Patent
Singh et al.

(10) Patent No.: US 11,475,490 B2
(45) Date of Patent: Oct. 18, 2022

(54) METHOD AND SYSTEM FOR VEHICLE ALLOCATION TO CUSTOMERS FOR RIDE-SHARING

(71) Applicant: ANI Technologies Private Limited, Karnataka (IN)

(72) Inventors: Gagandeep Singh, Bengaluru (IN); Vivek Singh, Arwal (IN)

(73) Assignee: ANI Technologies Private Limited, Bengaluru (IN)

( * ) Notice: Subject to any disclaimer, the term of this patent is extended or adjusted under 35 U.S.C. 154(b) by 73 days.

(21) Appl. No.: 16/729,407

(22) Filed: Dec. 29, 2019

(65) Prior Publication Data
US 2020/0211070 A1 Jul. 2, 2020

(30) Foreign Application Priority Data
Dec. 31, 2018 (IN) .............................. 201841050066

(51) Int. Cl.
*G06Q 10/02* (2012.01)
*G06Q 30/02* (2012.01)
(Continued)

(52) U.S. Cl.
CPC ..... *G06Q 30/0284* (2013.01); *G01C 21/3438* (2013.01); *G01C 21/3453* (2013.01);
(Continued)

(58) Field of Classification Search
CPC .... G06Q 30/0284; G06Q 10/02; G06Q 50/30; G01C 21/3438; G01C 21/3453; G08G 1/202
(Continued)

(56) References Cited

U.S. PATENT DOCUMENTS 9,886,671 B2 2/2018 Lord et al.
10,248,913 B1* 4/2019 Gururajan .............. G06Q 10/02
705/5
(Continued)

OTHER PUBLICATIONS

Eleonora D'Andrea, "Path Clustering Based on a Novel Dissimilarity Function for Ride-Sharing Recommenders", IEEE, 978-1-5090-0898-8. (Year: 2016).*
(Continued)

*Primary Examiner* — Allison G Wood
*Assistant Examiner* — John G Webster
(74) *Attorney, Agent, or Firm* — Chip Law Group

(57) ABSTRACT

Vehicle allocation method and system for ride-sharing are provided. The method includes receiving a first set of booking requests is received, at a first time instance, from a set of customer devices for sharing one or more rides. A second set of booking requests is determined, at a second time instance, based on the first set of booking requests and a third set of booking requests. The third set of booking requests is determined based on at least one of historical booking data and booking requests received after the first time instance. A set of vehicles available for the one or more rides is determined at the second time instance. A graph is generated based on the second set of booking requests and the set of available vehicles. An available vehicle is allocated to one or more customers based on optimal matching between nodes of the graph.

18 Claims, 11 Drawing Sheets

(51) Int. Cl.
*G01C 21/34* (2006.01)
*G08G 1/00* (2006.01)
*G06Q 50/30* (2012.01)

(52) U.S. Cl.
CPC ............ *G06Q 10/02* (2013.01); *G06Q 50/30* (2013.01); *G08G 1/202* (2013.01)

(58) Field of Classification Search
USPC .............. 705/13, 417, 5, 346, 7.14; 701/533
See application file for complete search history.

(56) References Cited

U.S. PATENT DOCUMENTS

| | | |
|---|---|---|
| 2015/0161564 A1 | 6/2015 | Sweeney et al. |
| 2016/0307287 A1* | 10/2016 | Jat .......................... G06Q 50/30 705/26.7 |
| 2018/0172459 A1* | 6/2018 | Mazzella ........... G01C 21/3415 701/411 |
| 2018/0224866 A1* | 8/2018 | Alonso-Mora ...... G05D 1/0291 701/26 |
| 2018/0276586 A1* | 9/2018 | Treasure .......... G06Q 10/06312 705/7.22 |
| 2018/0356238 A1* | 12/2018 | Berlingerio ........ G01C 21/3438 701/517 |

OTHER PUBLICATIONS

"Rong-Hua Li, Lu Qin, Jeffrey Xu Yu, Rui Mao," Optimal Multi-Meeting Point Route Search, IEEE Transactions On Knowledge and Data Engineering, col. XXX, No. XXX, 2012.

* cited by examiner

| Parameters<br>Customers | Distance between source location and pick-up location | Distance between pick-up location and drop-off location | Distance between vehicle (108a) location and pick-up location of customer | Distance between vehicle (108b) location and pick-up location of customer |
|---|---|---|---|---|
| Customer 112a | 100 m | 15000 m | 2500 m | 8000 m |
| Customer 112b | 50 m | 3000 m | 6000 m | 14000 m |
| Customer 112c | 0 m | 3000 m | 13000 m | 1000 m |

METHOD AND SYSTEM FOR VEHICLE ALLOCATION TO CUSTOMERS FOR RIDE-SHARING

CROSS-RELATED APPLICATIONS

This application claims priority of Indian Application Serial No. 201841050066, filed Dec. 31, 2018, the contents of which are incorporated herein by reference.

FIELD

Various embodiments of the disclosure relate generally to ride-sharing systems. More specifically, various embodiments of the disclosure relate to vehicle allocation to customers for ride-sharing.

BACKGROUND

Transport service providers (e.g., cab service providers such as OLA) offer on-demand vehicle services, in addition to public transportation services that are already available in a geographical region. The public transportation services, though usually cheap, causes inconvenience to travelers, owing to in-vehicle hassle and lack of comfort and privacy. Such unwanted in-vehicle experiences discourage the travelers from using the various modes of public transportation services. While the public transportation services are still widely used, private transportation services have gained prominence in the recent times. In modern cities, the transport service providers play an important role in providing the private transportation services, such as on-demand cab services, to the travelers for traveling to their desired destinations.

On-demand vehicle service providers allow a customer to book a vehicle exclusively for her use. For example, on individual basis, the customer initiates a booking request for the vehicle by means of a software application or a web application (associated with an on-demand vehicle service provider) and provides ride-related details such as a pick-up location, a drop-off location, or the like. The on-demand vehicle service provider may also allow the customer to choose from different tiers of vehicles. Upon receipt of confirmation of the booking request, the on-demand vehicle service provider allocates an available vehicle to the customer, in line with the customer's booking request, and thereafter, a driver of the allocated vehicle transport the customer from the pick-up location to the drop-off location. When the vehicle is booked on individual basis, a ride fare for the requested ride is paid in full by the customer. Also, with respect to such type of bookings, most of the vehicles tend to travel with minimum occupancy. Thus, in the event of an increased demand for the vehicle services at any given time, roads are crowded with the vehicles, which results in an increase in carbon dioxide ($CO_2$) emissions from the vehicles. Thus, various environmental problems, such as air pollution and global warming, have severely increased that are affecting the environment and daily lives of individuals. To overcome such problems, the transport providers offer ride-sharing of a vehicle among two or more customers. In such ride-sharing scenarios, two or more customers can be allocated the same vehicle on shared-basis.

On shared-basis, the two or more customers travelling along the same route (or different routes with minimum deviations) share the same vehicle. Thus, the number of vehicles that are operating on the roads at any given time instant may decrease, which may result in a decrease in the $CO_2$ emissions from the vehicles, and which may eventually reduce the adverse effects on the environment and the individuals. Further, when the bookings are made on shared-basis, the customer has to spend less on the ride fare as compared to the scenario when the customer books the vehicle on individual basis. Thus, the overall demand for ride-sharing is on a rise. With more and more requests for ride-sharing, it becomes important for the on-demand vehicle service provider to efficiently allocate vehicles to customers requesting for ride-sharing at the same time.

Currently, there are several stumbling blocks in implementation of ride-sharing. One problem is allocation of a vehicle to customers traveling to destinations in different directions, resulting in high degrees of deviation from a route of an individual customer. Also, substantial time is taken for ride-share vehicles to reach the customers' pick-up locations. These impediments often lead to unsavory experiences for the customers. Additionally, the current implementation of ride-sharing do not take into account other important factors, such as traffic conditions, demand-supply pattern, or the like, for allocation of the vehicle to the customers. Generally, the current implementation of ride-sharing is based on a single factor such as shortest-path to destination, distances between customers' pickup locations, or the like. Thus, the current implementation of ride-sharing does not provide optimal allocation of the vehicle to the customers.

In light of the foregoing, there exists a need for a technical and more reliable solution that overcomes the above-mentioned problems and manages allocation of the vehicles to the customers for ride-sharing in an optimal manner such that business objectives of the on-demand vehicle service providers are achieved while maintaining a high degree of customer satisfaction, which in turn will help in maximizing share-ride bookings.

SUMMARY

One embodiment of the present disclosure provide vehicle allocation method and system for ride-sharing. The method includes one or more operations that are executed by circuitry of the system for allocating vehicles to customers in a ride-sharing environment. The circuitry receives, at a first time instance, a first set of booking requests from a set of customer devices of a set of customers for sharing one or more rides. Each booking request includes at least one of a pick-up location, a drop-off location, or a customer profile of an associated customer. The circuitry determines, at a second time instance, a second set of booking requests based on the first set of booking requests and a third set of booking requests. The third set of booking requests is determined based on at least one of historical booking data and booking requests received after the first time instance. The circuitry further determines, at the second time instance, a set of vehicles available for the one or more rides. The set of vehicles is determined from one or more vehicles based on allocation data of the one or more vehicles.

The circuitry generates a graph including first and second sets of nodes and a set of edges. Each node in the first set of nodes represents at least one booking request from the second set of booking requests. Further, each node in the second set of nodes represents a vehicle from the set of vehicles. Further, each edge from the set of edges represents matching between first and second nodes from the first set of nodes and the second set of nodes, respectively. The matching is determined based on a plurality of share-ride parameters. The plurality of share-ride parameters include a degree of deviation from a route, a gross merchandise value, a sharing efficiency, a number of customers, a pick-up time, a measure of dry run, and a degree of customer satisfaction. Based on the generated graph, the circuitry allocates a vehicle from the set of vehicles to one or more customers from the set of customers for their rides.

In another embodiment of the present disclosure, the circuitry generates a multivariate vector for each edge based on a parameter value of the plurality of share-ride parameters associated with each edge. The circuitry further determines an edge score for each edge based on the multivariate vector and a weight associated with each ride share-parameter. The weight associated with each share-ride parameter is set based on at least one of a geographical area or a time of a day associated with each booking request. Thereafter, the circuitry allocates the vehicle to the one or more customers based on the edge score associated with each edge.

Thus, the method and the system of the present disclosure facilitate a transport provider to optimize allocation of vehicles to customers in a ride-sharing environment for ensuring optimal occupancy of the vehicles in ride-sharing. Further, such optimal allocation of the vehicles may ensure that the transport provider as well as drivers of the allocated vehicles do not incur losses while providing share-ride services to the customers. Thus, the method and the system of the present disclosure provide efficient and optimal allocation of the vehicles to the customers for on-demand vehicle services in the ride-sharing environment.

BRIEF DESCRIPTION OF THE DRAWINGS

The accompanying drawings illustrate the various embodiments of systems, methods, and other aspects of the disclosure. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice-versa.

FIGS. 3A-3D, collectively, illustrate exemplary environments in which customers are matched for ride-sharing, in accordance with an embodiment of the present disclosure;

DETAILED DESCRIPTION

Figure 1:
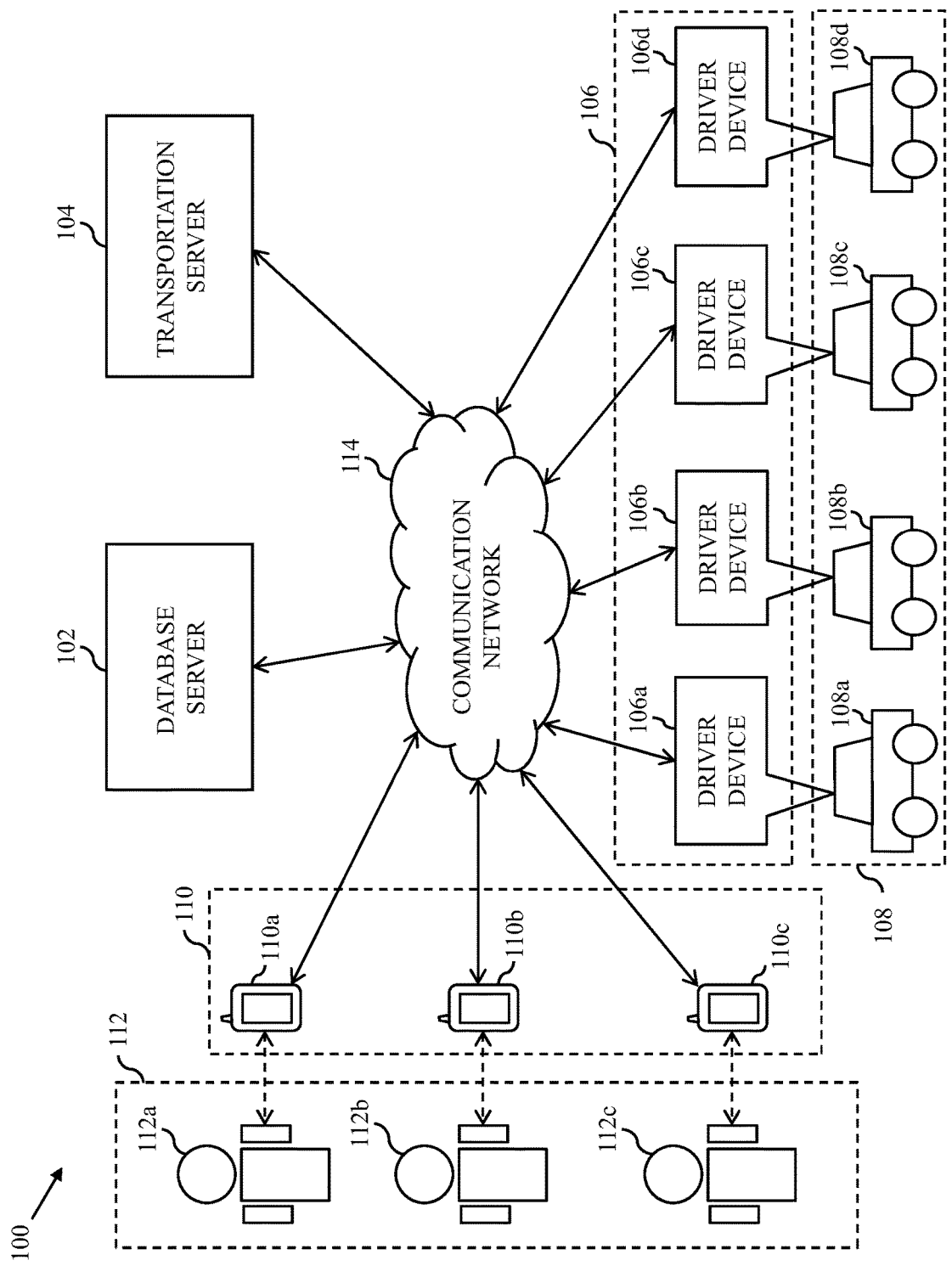
FIG. 1 is a block diagram that illustrates an environment in which various embodiments of the present disclosure are practiced.

As used in the specification and claims, the singular forms "a", "an" and "the" may also include plural references. For example, the term "an article" may include a plurality of articles. Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present disclosure. There may be additional components described in the foregoing application that are not depicted on one of the described drawings. In the event such a component is described, but not depicted in a drawing, the absence of such a drawing should not be considered as an omission of such design from the specification.

Before describing the present disclosure in detail, it should be observed that the present disclosure uses a combination of system components, which constitutes systems and methods for allocating vehicles to customers in a ride-sharing system. Accordingly, the components and the method steps have been represented, showing only specific details that are pertinent for an understanding of the present disclosure so as not to obscure the disclosure with details that will be readily apparent to those with ordinary skill in the art having the benefit of the description herein. As required, detailed embodiments of the present disclosure are disclosed herein; however, it is to be understood that the disclosed embodiments are merely exemplary of the disclosure, which can be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure. Further, the terms and phrases used herein are not intended to be limiting but rather to provide an understandable description of the disclosure.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Terms Description (in Addition to Plain and Dictionary Meaning)

Vehicle is a means of transport that is deployed by a vehicle transit system, such as a vehicle service provider, to provide vehicle services to one or more customers. For example, the vehicle is an automobile, a bus, a car, a bike, or the like. The one or more customers may travel in the vehicle to commute between their source and destination locations.

Booking request is a request for a ride, for example, a share-ride or a non-share ride, initiated by a customer in an online manner. The customer may initiate the booking request to travel from one location to another location. The booking request includes at least one of a pick-up location, a drop-off location, a vehicle type, a booking type, or the like. A first set of booking requests refers to one or more booking requests, for share-rides, initiated by one or more customers at a first time instance or duration. A second set of booking requests refers to one or more booking requests that are determined based on the first set of booking requests and a third set of booking requests. The third set of booking requests includes one or more booking requests that are determined based on at least historical booking data. The third set of booking requests may also include one or more booking requests that have been received after the first time instance or duration.

Pick-up location is a point of location in a geographical area from where a customer boards a vehicle for a ride. Prior to boarding the vehicle, the customer initiates a request for the ride from the pick-up location or another location that is different from the pick-up location. In a scenario where the request for the ride has been initiated from another location, the customer may reach the pick-up location from another location after allocation of the vehicle to the customer for the ride.

Drop-off location is a point of location in a geographical area where a customer may want to travel to in a vehicle from a pick-up location. The customer exits the vehicle after completion of a ride requested by the customer.

Allocation data is data associated with allocation of a vehicle to a customer for offering a ride based on a booking request initiated by the customer for the ride. The vehicle is automatically allocated to the customer by a ride-hailing server in an online manner. Based on the allocation, the ride-hailing server generates the allocation data. The allocation data may include at least one of pick-up and drop-off locations of the ride, a ride-start time from the pick-up location, vehicle information of the allocated vehicle, driver information of a driver of the allocated vehicle, or customer information of the customer.

Direction information is information including at least one direction for travelling from one location to another location. For example, a customer uses the direction information to reach a pick-up location for a ride. Similarly, a driver of a vehicle allocated to the customer uses the direction information to drive the vehicle from the pick-up location to a drop-off location associated with the ride requested by the customer. The direction information may be communicated to the customer or the driver in the form of a graphical representation, a text-based representation, a voice-based representation, or a combination thereof. For example, the direction information may be communicated by means of a digital map that is rendered on a computing device of the customer or the driver in an online manner.

Historical booking data refers to booking data, pertinent to rides (for example, share-rides), including at least historical booking requests initiated by various customers in the past and corresponding allocation data and/or cancellation data. The historical booking data may further include data regarding historical demand-supply patterns, road traffic conditions, weather conditions, travelling behavior patterns of the customers, or the like.

Graph is a data structure including one or more nodes and edges. In an embodiment, the graph includes at least a first set of nodes, a second set of nodes, and a set of edges. Each node from the first set of nodes represents one or more booking requests from a second set of booking requests. Each node from the second set of nodes represents a vehicle from a set of vehicles available for one or more share-rides. An edge, from the set of edges, between a node from the first set of nodes and a node from the second set of nodes indicates a matching between the booking requests represented by the node from the first set of nodes and the vehicle represented by the node from the second set of nodes. Vehicles are allocated to customers based on at least the graph.

Share-ride parameters refer to one or more selection variables that are pertinent in the context of one or more rides such as share-rides. Examples of share-ride parameters include, but are not limited to, a gross merchandise value, a sharing efficiency, a number of customers, a pick-up time, a dry run, a deviation from a route, and customer satisfaction.

Edge score of an edge is a numerical values that is determined based on one or more share-ride parameters associated with the edge.

Gross merchandise value (GMV) for a vehicle is defined based on a revenue associated with the vehicle. In one example, the GMV is defined as a revenue per ride. In another example, the GMV is defined as revenue per unit of distance or time.

Sharing efficiency of a share-ride, including two or more customers travelling in a share-ride vehicle, is defined as a distance travelled together by the two or more customers as a percentage of the total distance covered by the vehicle from a first pick-up location to a last drop-off location associated with the share-ride. Sharing efficiency is "0" when a share-ride vehicle is unoccupied or when the share-ride vehicle is occupied by a single customer.

Dry run for a vehicle is defined as a distance covered by a vehicle without a single customer in the vehicle post allocation of the vehicle to a customer. An example of the dry run is the distance covered by the vehicle to reach the customer's pick-up location with no other customer occupying a seat in the vehicle post the allocation.

Referring now to FIG. 1, a block diagram that illustrates an environment 100 in which various embodiments of the present disclosure are practiced is shown. The environment 100 includes a database server 102, a transportation server 104, a set of driver devices 106 (such as driver devices 106a, 106b, 106c, and 106d) associated with a set of vehicles 108 (such as vehicles 108a, 108b, 108c, and 108d), and a set of customer devices 110 (such as customer devices 110a, 110b, and 110c) associated with a set of customers 112 (such as customers 112a, 112b, and 112c). The database server 102, the transportation server 104, the set of driver devices 106, and the set of customer devices 110 communicate with each other by way of a communication network 114.

The database server 102 may include suitable logic, circuitry, interfaces, and/or code, executable by the circuitry, that may be configured to perform one or more operations, such as receiving, storing, processing, and transmitting queries, data, or content. The database server 102 may be a data management and storage computing device that is communicatively coupled with the transportation server 104, the set of driver devices 106, and the set of customer devices 110 via the communication network 114 to perform the one or more operations. In an exemplary embodiment, the database server 102 may be configured to manage and store driver information of each driver (such as drivers associated with the vehicles 108a-108d), vehicle information of each vehicle (such as the vehicles 108a-108d), and customer information of each customer (such as the customers 112a-112c). For example, the customer information may include information such as a customer name, a customer contact number, a customer rating, or a customer's behavioral information. The driver information may include information such as a driver name, a driver contact number, a driver rating, or other driver-related information. The vehicle information may include information such as a vehicle type, a vehicle capacity, a vehicle number, or other vehicle-related information.

In an embodiment, the database server 102 may be configured to manage and store historical booking data associated with a vehicle service provider that offers booking of on-demand vehicle services by one or more customers (such as the set of customers 112) in an online manner. For example, the historical booking data may include historical demand and supply associated with one or more geographical areas (or one or more routes associated with each geographical area) and historical pick-up and drop-off locations associated with each historical demand and supply. The historical booking data may further include a log of cancelled booking requests by the one or more customers. In an embodiment, the database server 102 may be configured to manage and store historical or real-time traffic information indicating historical or real-time traffic conditions along the one or more routes. In an embodiment, the database server 102 may be configured to manage and store real-time booking data, for example, a set of booking requests that is received in real-time from the set of customer devices 110 of the set of customers 112. In an embodiment, the database server 102 may be configured to manage and store allocation data of one or more vehicles, such as the set of vehicles 108. The allocation data includes the current allocation information of each vehicle. In an embodiment, the database server 102 may be configured to manage and store location data of each vehicle. The location data may include global positioning system (GPS) information of real-time location of each vehicle. Such GPS information may be tracked on a digital map based on one or more locations pings transmitted by one or more GPS-based sensors associated with each vehicle.

In an embodiment, the database server 102 may be configured to receive one or more queries from the transportation server 104 via the communication network 114. The one or more queries may include one or more requests for retrieving requisite information (such as the customer information, the driver information, the vehicle information, the allocation and location data, or any combination thereof). The database server 102, in response to the received one or more queries, may be configured to retrieve and transmit the requested information to the transportation server 104 via the communication network 114. Examples of the database server 102 include, but are not limited to, a personal computer, a laptop, or a network of computer systems.

The transportation server 104 may include suitable logic, circuitry, interfaces, and/or code, executable by the circuitry, that may be configured to perform one or more operations for online vehicle allocation to the one or more customers such as the set of customers 112. The transportation server 104 may be a computing device, which may include a software framework, that may be configured to create the transportation server implementation and perform the various operations associated with the online vehicle allocation. The transportation server 104 may be realized through various web-based technologies, such as, but not limited to, a Java web-framework, a .NET framework, a PHP framework, a python framework, or any other web-application framework. Examples of the transportation server 104 include, but are not limited to, a personal computer, a laptop, or a network of computer systems.

In an embodiment, the transportation server 104 may be configured to receive a first set of booking requests from the set of customer devices 110 of the set of customers 112 for sharing one or more rides. Each booking request may include at least one of a pick-up location, a drop-off location, or a customer profile. The first set of booking requests may be received at a first time instance (e.g., 10:00 AM) or during a first time duration (e.g., between 10:00 AM and 10:05 AM). The transportation server 104 may be further configured to determine a second set of booking requests at a second time instance (e.g., 10:05 AM) or during a second time period (e.g., between 10:00 AM and 10:10 AM). The second set of booking requests includes the first set of booking requests and a third set of booking requests. The third set of booking requests may be determined based on at least the historical booking data. The historical booking data may be associated with the same time instance (such as the second time instance) or the same time period (such as the second time period). The third set of booking requests may be further determined based on one or more booking requests that have been received after the first time instance or the first time period.

In an embodiment, the transportation server 104 may be configured to determine the set of vehicles 108 available for one or more share-rides at the second time instance (e.g., 10:05 AM) or at the end of the second time period (e.g., 10:10 AM). In one example, the set of vehicles 108 may be determined or identified from one or more vehicles based on at least one of the allocation data of each of the one or more vehicles and the first set of booking requests. In another example, the set of vehicles 108 may be determined or identified from one or more vehicles based on at least one of the allocation data of each of the one or more vehicles and the second set of booking requests. In another example, the set of vehicles 108 may be determined or identified from one or more vehicles based on at least one of the allocation data of each of the one or more vehicles and the third set of booking requests.

In an embodiment, the transportation server 104 may be configured to generate an allocation-estimation graph including one or more sets of nodes and edges. For example, the transportation server 104 may generate a graph including a first set of nodes, a second set of nodes, and a set of edges. Each node in the first set of nodes may represent at least one booking request from the second set of booking requests. Each node in the second set of nodes may represent a vehicle from the set of vehicles 108. Each edge from the set of edges may represent matching between first and second nodes from the first set of nodes and the second set of nodes, respectively. In an embodiment, the transportation server 104 may be configured to determine the matching based on a plurality of share-ride parameters including at least a degree of deviation from a route associated with the first and second nodes and a sharing efficiency. The plurality of share-ride parameters may further include at least one of a gross merchandise value (GMV), a number of customers, a pick-up time, a measure of dry run, or a degree of customer satisfaction.

In an embodiment, the transportation server 104 may be configured to allocate one or more vehicles from the set of vehicles 108 to the one or more customers from the set of customers 112 based on at least the generated graph. For example, the transportation server 104 may allocate a vehicle (such as the vehicle 108a) from the set of vehicles 108 to the one or more customers (such as the customers 112a and 112b) from the set of customers 112 based on a parameter value of each of the plurality of share-ride parameters associated with each edge from the set of edges. Thereafter, the transportation server 104 may be configured to generate the allocation data and the direction information based on the allocation, and communicate the allocation data and the direction information (e.g., a digital map with requisite location coordinates pinged therein) to each customer (associated with a successful vehicle allocation) and each driver of the corresponding allocated vehicle. The allocation data may include at least the pick-up location, the drop-off location, the driver information, the vehicle information, the customer information, the number of customers sharing the allocated vehicle, or the like. The allocation data may also include, for each customer, ride fare information including at least a ride fare that is payable by each customer for availing the share-ride. The direction information may be communicated in the form of the digital map that includes at least one of a customer's route from a customer's current location to the pick-up location, a driver's route from a driver's current location to the pick-up location, a ride route from the pick-up location to the drop-off location, or the like.

Each of the set of driver devices 106, such as the driver device 106*a*, 106*b*, 106*c*, or 106*d*, may include suitable logic, circuitry, interfaces, and/or code, executable by the circuitry, that may be configured to perform one or more operations associated with various ride services. For example, the driver device 106*a* may be a computing device that is utilized by the driver of the vehicle 108*a* to perform the one or more operations. The driver device 106*a* may be utilized, by the driver of the vehicle 108*a*, to view a new booking request offered by the transportation server 104. The driver device 106*a* may be further utilized, by the driver of the vehicle 108*a*, to accept or reject the new booking request. The driver device 106*a* may be utilized, by the driver of the vehicle 108*a*, to input or update the driver or vehicle information by means of a service application that runs on the driver device 106*a*. The driver device 106*a* may be utilized, by the driver of the vehicle 108*a*, to login or logout of a ride-hailing platform (e.g., the transportation server 104) associated with the vehicle service provider. The driver device 106*a* may be utilized, by the driver of the vehicle 108*a*, to input one or more preferences for working hours, ride types, feedback, or the like. The driver device 106*a* may be utilized, by the driver of the vehicle 108*a*, to view the current allocation data associated with the vehicle 108*a*. The driver device 106*a* may be utilized, by the driver of the vehicle 108*a*, to view the direction information between a plurality of locations by accessing the digital map (hosted by the transportation server 104) on the driver device 106*a*.

In an embodiment, the driver device 106*a* may be configured to transmit booking status information and position information to the transportation server 104 via the communication network 114. The booking status information may indicate an availability status of the vehicle 108*a* i.e., whether the vehicle 108*a* is currently occupied with an ongoing booking request or the vehicle 108*a* is available for a new allocation corresponding to the new booking request. The position information may include the real-time location information (e.g., GPS coordinates) of the driver device 106*a*, which in turn is indicative of the real-time location information of the vehicle 108*a*. The driver device 106*a* may include one or more position-tracking sensors (e.g., GPS sensors) for tracking and measuring the position information of the driver device 106*a* by way of a GPS navigation system.

In an exemplary embodiment, the driver device 106*a* may be a vehicle head unit. In another exemplary embodiment, the driver device 106*a* may be an external communication device, such as a smartphone, a tablet computer, a laptop, or any other portable communication, that is placed inside the vehicle 108*a*. Various functionalities, operations, usages, and examples of the driver devices 106*b*-106*d* are similar to that of the driver device 106*a*, as described above.

Each of the set of customer devices 110, such as the customer device 110*a*, 110*b*, or 110*c*, may include suitable logic, circuitry, interfaces, and/or code, executable by the circuitry, that may be configured to perform one or more operations associated with an online booking request for availing an on-demand ride service. For example, the customer device 110*a* may be a computing device that is utilized, by the customer 112*a*, to initiate the one or more operations by means of a service application (associated with the vehicle service provider such as OLA) running on the customer device 110*a*. For example, the customer device 110*a* may be utilized, by the customer 112*a*, to initiate an online booking request for a share-ride. The customer device 110*a* may be further utilized, by the customer 112*a*, to provide ride-related details of the share-ride such as a pick-up location, a drop-off location, a vehicle type, a preferred pick-up time, or the like.

The customer device 110*a* may be further utilized, by the customer 112*a*, to view the allocation data communicated by the transportation server 104. The allocation data may include the pick-up location, the drop-off location, the driver information of the allocated vehicle, the vehicle information of the allocated vehicle, an estimated ride-start time from the pick-up location, an estimated ride-time duration to reach the drop-off location, or the like. The customer device 110*a* may be further utilized, by the customer 112*a*, to view the direction information associated with the booking request. The direction information and the allocation data may be provided to the customer 112*a* in the form of a graphical representation, a text-based representation, a voice-based representation, or a combination thereof. Examples of the customer device 110*a* include, but are not limited to, a personal computer, a laptop, a smartphone, and a tablet computer. Various functionalities, operations, usages, and examples of the customer devices 110*b* and 110*c* are similar to that of the customer device 110*a*, as described above.

The communication network 114 may include suitable logic, circuitry, interfaces, and/or code, executable by the circuitry, that may be configured to transmit queries, messages, data, and requests between various entities, such as the database server 102, the transportation server 104, the set of driver devices 106, and the set of customer devices 110. Examples of the communication network 114 include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof. Various entities in the environment 100 may connect to the communication network 114 in accordance with various wired and wireless communication protocols, such as Transmission Control Protocol and Internet Protocol (TCP/IP), User Datagram Protocol (UDP), Long Term Evolution (LTE) communication protocols, or any combination thereof.

Figure 2:
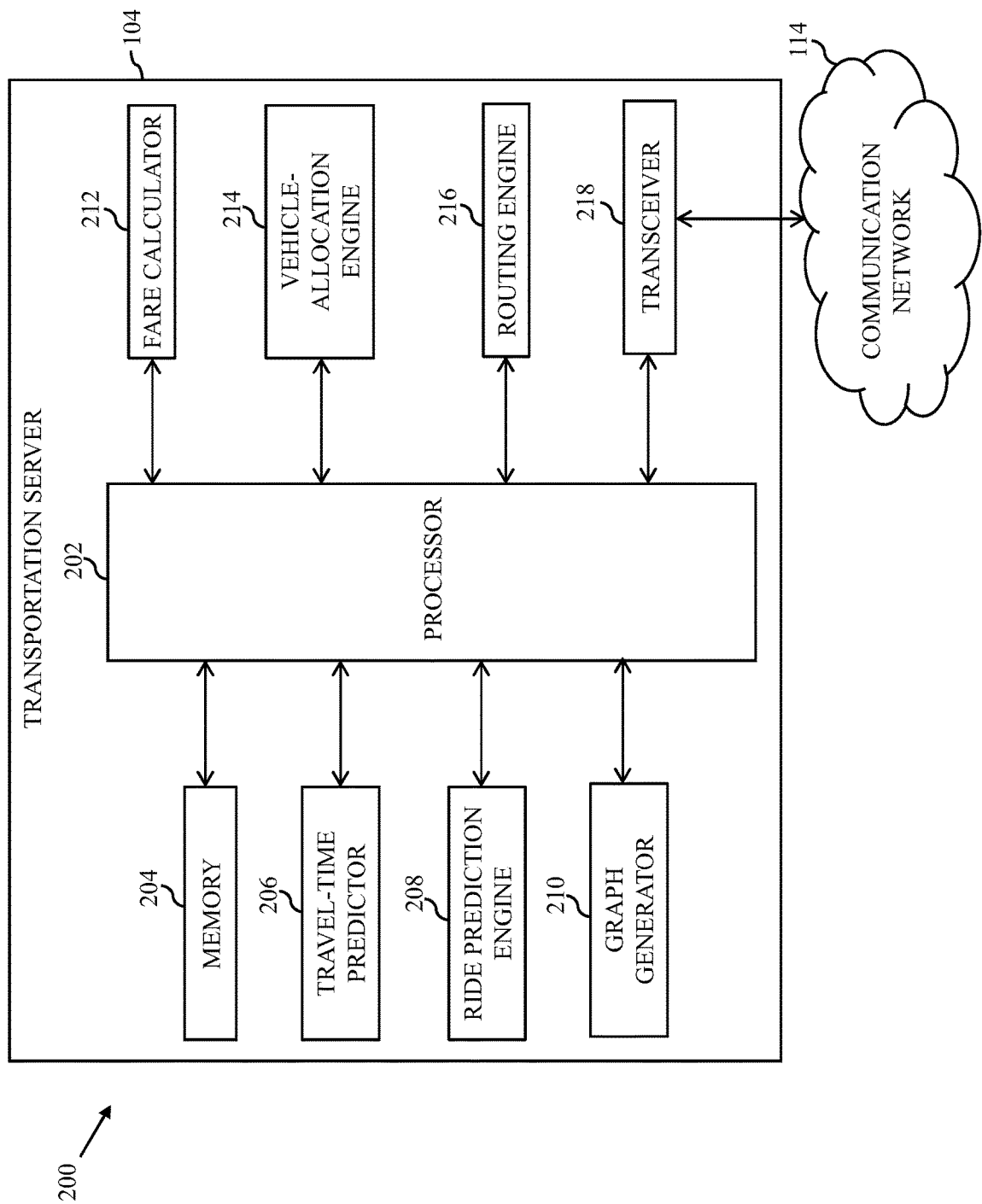
FIG. 2 is a block diagram that illustrates a transportation server of FIG. 1, in accordance with an embodiment of the present disclosure.

Referring now to FIG. 2, a block diagram 200 that illustrates the transportation server 104 is shown, in accordance with an embodiment of the present disclosure. The transportation server 104 includes circuitry such as a processor 202, a memory 204, a travel-time predictor 206, a ride prediction engine 208, a graph generator 210, a fare calculator 212, a vehicle allocation engine 214, a routing engine 216, and a transceiver 218.

The processor 202 may include suitable logic, circuitry, interfaces, and/or codes, executable by the circuitry, that may be configured to perform the one or more operations. For example, the processor 202 may be configured to receive, at the first time instance, the first set of booking requests from the set of customer devices 110 via the communication network 114, and store the first set of booking requests in the memory 204. The processor 202 may be further configured to determine, at the second time instance, the second set of booking requests, and store the second set of booking requests in the memory 204. The processor 202 may be further configured to process each booking request to determine at least a pick-up location, a drop-off location, and other ride-related preferences, such as a number of seats required for the ride, a vehicle type, or the like. The processor 202 may be further configured to retrieve the historical booking data from the database server 102. The historical booking data may be retrieved based on at least one of a booking request, a time of the day associated with the booking request, a type of the day associated with the booking request, the current weather and traffic conditions, or the like. The processor 202 may be further configured to transmit the allocation data and the direction information to the set of customer devices 110, such as the customer device 110a of the customer 112a, and the set of driver devices 106, such as the driver device 106a associated with the vehicle 108a, based on the allocation of the vehicle 108a to the customer 112a. The processor 202 may communicate instructions and control commands to other circuitry of the transportation server 104, such as the memory 204, the travel-time predictor 206, the ride prediction engine 208, the graph generator 210, the fare calculator 212, the vehicle allocation engine 214, the routing engine 216, and the transceiver 218, for performing their corresponding operations, as described below. Examples of the processor 202 include, but are not limited to, an application-specific integrated circuit (ASIC) processor, a reduced instruction set computing (RISC) processor, a complex instruction set computing (CISC) processor, or a field-programmable gate array (FPGA). It will be apparent to a person skilled in the art that the processor 202 is compatible with multiple operating systems.

The memory 204 may include suitable logic, circuitry, interfaces, and/or codes, executable by the circuitry, that may be configured to store one or more instructions or codes that are executed by the processor 202, the travel-time predictor 206, the ride prediction engine 208, the graph generator 210, the fare calculator 212, the vehicle allocation engine 214, the routing engine 216, and the transceiver 218 to perform their operations. In an embodiment, the memory 204 may be configured to store the first set of booking requests, the second set of booking requests, and the third set of booking requests. The memory 204 may be further configured to store route selection information, time duration information, ride fare information, allocation data, direction information, customer information, driver information, vehicle information, or the like. Examples of the memory 204 include, but are not limited to, a random-access memory (RAM), a read-only memory (ROM), a programmable ROM (PROM), and an erasable PROM (EPROM).

The travel-time predictor 206 may include suitable logic, circuitry, interfaces, and/or codes, executable by the circuitry, that may be configured to execute one or more time prediction operations. For example, the travel-time predictor 206 may be configured to predict an estimated time of reaching the pick-up location by each customer (such as the customer 112a, 112b, or 112c) from the current location. Additionally, the travel-time predictor 206 may be further configured to predict an estimated time of arrival of each vehicle (such as the vehicle 108a, 108b, 108c, or 108d) at the pick-up location of each allocated customer (such as the customer 112a, 112b, or 112c). Further, the travel-time predictor 206 may be further configured to predict an estimated time of ride completion of the ride requested by each customer (such as the customer 112a, 112b, or 112c).

In an embodiment, the travel-time predictor 206, under the control of the processor 202, may communicate the predicted information, such as the estimated time of reaching the pick-up location by each customer, the estimated time of arrival at the pick-up location by each vehicle, and the estimated time of ride completion, to one or more concerned entities associated with each vehicle allocation, such as a driver of the vehicle 108a and the customer 112a has been allocated the vehicle 108a for the requested ride. The travel-time predictor 206 may be implemented by one or more processors, such as, but are not limited to, an ASIC processor, a RISC processor, a CISC processor, and an FPGA.

The ride prediction engine 208 may include suitable logic, circuitry, interfaces, and/or codes, executable by the circuitry, that may be configured to execute one or more ride prediction operations. For example, the ride prediction engine 208 may be configured to predict future demand based on at least the historical booking data. The ride prediction engine 208 may be further configured to predict future demand based on one or more external events, such as a music concert, a sporting event, a political rally, a festive season, or the like. The ride prediction engine 208 may be further configured to predict future demand based on workplace timings. The ride prediction engine 208 may be further configured to predict future demand based on weather condition, traffic condition, current demand and supply, or the like. The ride prediction engine 208 may be implemented by one or more processors, such as, but are not limited to, an ASIC processor, a RISC processor, a CISC processor, and an FPGA.

The graph generator 210 may include suitable logic, circuitry, interfaces, and/or codes, executable by the circuitry, that may be configured to execute one or more graph generation operations. For example, the graph generator 210 may be configured to generate the graph including the first set of nodes, the second set of nodes, and the set of edges. The graph may be generated based on at least a set of booking requests (such as the first set of booking requests, the second set of booking requests, or any combination thereof) and a set of available vehicles (such as the set of vehicles 108). In an embodiment, each node of the first set of nodes represents one or more booking requests from the second set of booking requests and each node of the second set of nodes represents an available vehicle from the set of vehicles 108. The graph generator 210 may be configured to form an edge between two nodes in which one node is from the first set of nodes and another node is from the second set of nodes. In an embodiment, each edge from the set of edges represents matching between the first and second nodes from the first set of nodes and the second set of nodes, respectively. The matching is determined based on the plurality of share-ride parameters including at least the degree of deviation from a route associated with the first and second nodes and the sharing efficiency. The plurality of share-ride parameters further include at least one of the GMV, the number of customers, the pick-up time, the measure of dry run, or the degree of customer satisfaction.

In an embodiment, the graph generator 210 may be configured to generate a multivariate vector for each edge. The multivariate vector may be generated based on the parameter value of each of the plurality of share-ride parameters associated with each edge. The graph generator 210 may be further configured to determine an edge score for each edge based on the multivariate vector and a weight associated with each share-ride parameter. The weight associated with each share-ride parameter may be set based on at least one of a geographical area or a time of a day associated with each booking request. Further, in an embodiment, the graph generator 210 may be configured to modify the generated graph to obtain a modified graph such that no two edges in the modified graph share a common node. The modified graph may be obtained based on the edge score of each edge in the generated graph. The graph generator 210 may be implemented by one or more processors, such as, but are not limited to, an ASIC processor, a RISC processor, a CISC processor, and an FPGA.

The fare calculator 212 may include suitable logic, circuitry, interfaces, and/or codes, executable by the circuitry, that may be configured to execute one or more fare calculation operations. For example, based on the booking request initiated by the customer 112a, the fare calculator 212 may be configured to calculate a ride fare for the share-ride requested by the customer 112a. The ride fare may be calculated based on at least one of a ride distance between pick-up and drop-off locations, an estimated ride time between the pick-up and drop-off locations, a number of seats, or a vehicle type associated with the booking request initiated by the customer 112a. The fare calculator 212 may be further configured to incorporate a surge pricing factor for calculating the ride fare based on real-time demand and supply of a geographical region associated with the customer 112a. For example, the surge pricing factor may be incorporated for calculating the ride fare when there is deficit of share-ride vehicles in the geographical region and the demand is high for the share-rides. The fare calculator 212 may be further configured to dynamically update the ride fare during the share-ride based on real-time data, such as, but are not limited, traffic conditions, ride detouring, and in-vehicles services or features availed by the customer 112a during the ride. In an embodiment, the fare calculator 212 may be configured to store the ride fare information including the ride fare determined for each ride in the memory 204. The fare calculator 212 may be implemented by one or more processors, such as, but are not limited to, an ASIC processor, a RISC processor, a CISC processor, and an FPGA.

The vehicle allocation engine 214 may include suitable logic, circuitry, interfaces, and/or codes, executable by the circuitry, that may be configured to execute one or more vehicle allocation operations. For example, the vehicle allocation engine 214 may be configured to allocate an available vehicle, such as the vehicle 108a, to the one or more customers, such as the customers 112a and 112b, for the share-ride. The vehicle 108a may be allocated to the customers 112a and 112b based on at least the graph generated by the graph generator 210. Based on the allocation, the vehicle allocation engine 214 may be further configured to generate the allocation data and the direction information for each customer and driver (such as the customers 112a and 112b and the driver of the vehicle 108a) and communicate the allocation data and the direction information to each customer and driver. The allocation data may include the current allocation information including at least one of the customer information, the driver information, the ride fare information, or the timing information. The direction information may include navigational data for navigating between a plurality of locations and may be presented in the form of a digital map that is dynamically updated based on real-time movement of each customer, driver, and vehicle. In an embodiment, the vehicle allocation engine 214 may be further configured to generate a cancellation notification based on cancellation of an allocated vehicle (such as the vehicle 108a) by a customer (such as the customer 112a) and communicate the cancellation notification to at least the driver of the vehicle 108a. The vehicle allocation engine 214 may be implemented by one or more processors, such as, but are not limited to, an ASIC processor, a RISC processor, a CISC processor, and an FPGA.

The routing engine 216 may include suitable logic, circuitry, interfaces, and/or codes, executable by the circuitry, that may be configured to execute one or more route selection operations. For example, based on the pick-up and drop-off locations associated with the booking request initiated by the customer 112a, the routing engine 216 may be configured to determine at least one of a first route from a current location of the customer 112a to the pick-up location associated with the booking request, a second route from a current location of the vehicle 108a (allocated to the customer 112a) to the pick-up location of the customer 112a, or a third route from the pick-up location to the drop-off location associated with the booking request, and store the route selection information including at least one of the first route, the second route, or the third route in the memory 204. The direction information may be generated, by the vehicle allocation engine 214, based on at least the route selection information. The routing engine 216 may be implemented by one or more processors, such as, but are not limited to, an ASIC processor, a RISC processor, a CISC processor, and an FPGA.

The transceiver 218 may include suitable logic, circuitry, interfaces, and/or codes, executable by the circuitry, that may be configured to transmit (or receive) data, queries, messages, or the like to (or from) various servers or devices, such as the database server 102, the transportation server 104, the set of driver devices 106, and the set of customer devices 110. Examples of the transceiver 218 may include, but are not limited to, an antenna, a radio frequency transceiver, a wireless transceiver, and a Bluetooth transceiver. The transceiver 218 may be configured to communicate with the database server 102, the transportation server 104, the set of driver devices 106, and the set of customer devices 110 using various wired and wireless communication protocols, such as TCP/IP, UDP, LTE communication protocols, or any combination thereof. Various operations of the transportation server 104 along with their advantages and improvements will become apparent in conjunction with FIGS. 3A-3D and 4A-4C.

Figure 3A:
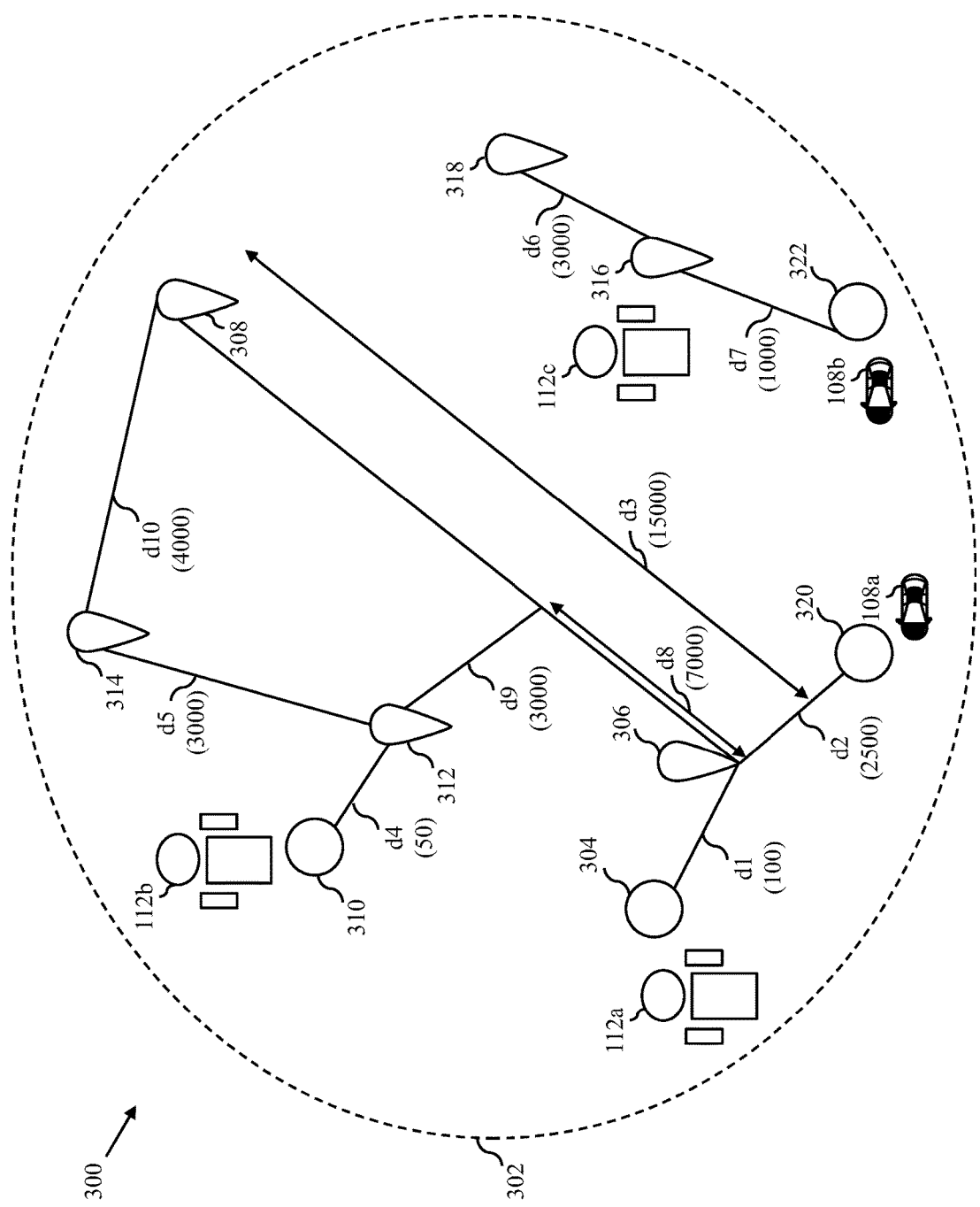

FIGS. 3A-3D, collectively, illustrate exemplary environments in which customers (such as the set of customers 112) are matched for ride-sharing, in accordance with an embodiment of the present disclosure. Referring to FIG. 3A, an exemplary environment 300 illustrates a geographical region 302 including a first source location 304, a first pick-up location 306, and a first drop-off location 308 associated with the customer 112a, a second source location 310, a second pick-up location 312, and a second drop-off location 314 associated with the customer 112b, and a third source location that is same as a third pick-up location 316 and a third drop-off location 318 associated with the customer 112c. Further, the geographical region 302 includes a first current location 320 and a second current location 322 of the vehicles 108a and 108b, respectively. Various distances d1-d11, as shown in FIG. 3A, have not been drawn to scale and should not be construed as limiting.

In the ongoing exemplary scenario (with reference to FIG. 3A), the transportation server 104 receives a first set of booking requests for one or more share-rides from the set of customer devices 110 (such as the customer devices 110a, 110b, and 110c) of the set of customers 112 (such as the customers 112a, 112b, and 112c, respectively). The first set of booking requests may be received at the first time instance or during the first time duration.

Each booking request includes at least a pick-up location and a drop-off location. Each booking request may be received from a respective source location associated with each customer. For example, the transportation server 104 may receive a booking request for a share-ride from the customer device 110a when the customer 112a is at the first source location 304. By availing the share-ride, the customer 112a may want to travel from the first pick-up location 306 to the first drop-off location 308. Similarly, the transportation server 104 may receive a booking request for a share-ride from the customer device 110b when the customer 112b is at the second source location 310. By availing the share-ride, the customer 112b may want to travel from the second pick-up location 312 to the second drop-off location 314. Similarly, the transportation server 104 may receive a booking request for a share-ride from the customer device 110c when the customer 112c is at the third source location (316). By availing the share-ride, the customer 112c may want to travel from the third pick-up location 316 to the third drop-off location 318.

After receiving the first set of booking requests from the customer devices 110a, 110b, and 110c, for example, at the second time instance, the transportation server 104 may determine one or more available vehicles (such as the vehicles 108a and 108b) that are currently located at the first current location 320 and the second current location 322. The vehicles 108a and 108b may be determined for executing an allocation process for allocating the vehicles 108a and 108b corresponding to the one or more share-rides requested by the customers 112a, 112b, and 112c.

Referring now to FIG. 3B, an exemplary table 324 quantifies the distances that are relevant to the allocation process, in accordance to the exemplary environment 300 illustrated in FIG. 3A. The table 324 shows, for the customers 112a, 112b, and 112c, a parameter value for each of one or more parameters such as 'distance between source and pick-up locations of each customer', 'distance between pick-up and drop-off locations of each customer', 'distance between first vehicle's current and pick-up locations' and 'distance between second vehicle's current and pick-up locations'. For example, the distance "d1" between the first source location 304 and the first pick-up location 306 of the customer 112a is 100 meter (m), the distance "d2" between the first pick-up location 306 of the customer 112a and the first current location of the vehicle 108a is 2500 m, and the distance "d3" between the first pick-up location 306 and the first drop-off location 308 of the customer 112a is 15000 m. Further, the distance between the first pick-up location 306 of the customer 112a and the second current location of the vehicle 108b is 8000 m. Similarly, other distances are shorn in the table 324 of FIG. 3B.

Figure 3C:
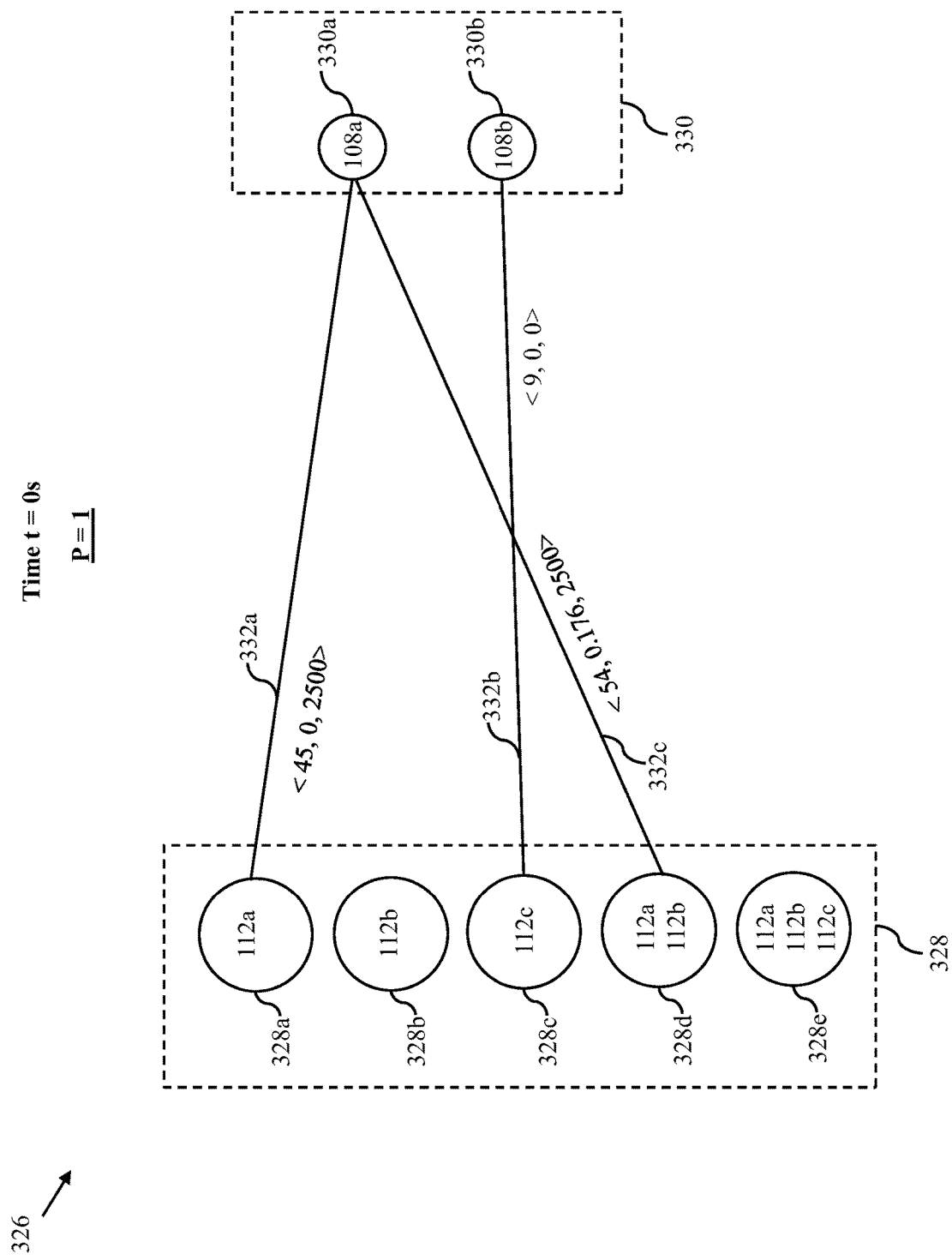

Referring now to FIG. 3C, an exemplary graph 326, generated by the graph generator 210, is shown to determine allocation of the one or more vehicles (such as the vehicles 108a and 108b) to the one or more customers (such as the customers 112a, 112b, and 112c), in accordance with the environment 300. The graph 326 includes a first set of nodes 328 (such as nodes 328a-328e), a second set of nodes 330 (such as nodes 330a and 330b), and a set of edges (such as edges 332a-332c). The nodes 328a-328e are associated with the first set of booking requests, received at the first time instance "t=0 s". Each node from the first set of nodes 328 represents one or more booking requests of the first set of booking requests received from the set of customer devices 110. Each node from the second set of nodes 330 represents an available vehicle such as the vehicle 108a or 108b. An edge between a first node from the first set of nodes 328 and a second node from the second set of nodes 330 represents a matching between the first node and the second node. Each edge has an associated multivariate vector. In the current embodiment, a multivariate vector includes a set of parameter values. Each parameter value corresponds to a share-ride parameter (such as GMV, sharing-efficiency, dry run, deviation from a route, or the like). The multivariate vector may be represented in the format '<GMV, sharing-efficiency, dry run, deviation from a route>'. In other embodiment, the multivariate vector may be represented in other formats and may include parameter values of other share-ride parameters, such as a loss, a driver rating, a customer rating, a number of customers, a pick-up time, a drop-off time, a distance between source and pick-up locations, a distance between pick-up and drop-off locations, a distance between vehicle's current and pick-up locations, or the like. The edge may be formed between the first node and the second node when the vehicle (such as the vehicle 108a or 108b) represented by the second node (such as the node 330a or 330b) can service, profitably, the one or more customers (such as the customers 112a, 112b, and/or 112c) represented by the first node (such as the node 328a-328e) while satisfying a set of one or more customer experience constraints such as 'pick-up within a certain time', 'deviation from a route below a certain threshold', or the like. The processor 202 (or the graph generator 210) may determine the weight for each share-ride parameter. The weight associated with each share-ride parameter may be set based on at least one of a geographical region or the time of the day associated with each booking request. The weight associated with each share-ride parameter may also be set based on real-time demand-supply index associated with ride-sharing. The graph generator 210 may compute the edge score for each edge based on the associated multivariate vector and the weight associated with each share-ride parameter of the associated multivariate vector. The graph generator 210 may further utilize the edge score to prune one or more edges, from the graph 326, to obtain a modified graph such that no two edges in the modified graph share a common node. The vehicle allocation engine 214 may further allocate the one or more available vehicles (such as the vehicles 108a and 108b) to the one or more customers (such as the customers 112a, 112b, and 112c) based on the modified graph generated by the graph generator 210.

In the current exemplary scenario, the customer 112a initiates a first booking request (as shown by the node 328a in FIG. 3C) for a share-ride using the customer device 110a. The first booking request includes at least the first source location 304, the first pick-up location 306, and the first drop-off location 308. The customer 112b initiates a second booking request (as shown by the node 328b in FIG. 3C) for a share-ride using the customer device 110b. The booking request includes at least the second source location 310, the second pick-up location 312, and the second drop-off location 314. The customer 112c initiates a third booking request (as shown by the node 328c in FIG. 3C) for a share-ride using the customer device 110c. The third booking request includes at least the third pick-up (source) location 316 and the third drop-off location 318. The distance between the first source location 304 and the first pick-up location 306 is 'd1', which equals 100 m. The distance between the first current location 320 of the vehicle 108a and the first pick-up location 306 is 'd2', which equals 2500 m. The distance between the first pick-up location 306 and the first drop-off location 308 is 'd3', which equals 15000 m. The distance between the second source location 310 and the second pick-up location 312 is 'd4', which equals 50 m. The distance between the second pick-up location 312 and the second drop-off location 314 is 'd5', which equals 3000 m. The distance between the third pick-up location 316 and the third drop-off location 318 is 'd6', which equals 3000 m. The distance between the third pick-up location 316 and the second current location 322 of the vehicle 108b is 'd7', which equals 1000 m.

In FIG. 3C, the nodes 328a-328c, from the first set of nodes 328, represent first through third booking requests. The node 328d represents a combination of the first and second booking requests. The node 328e represents a combination of the first, second, and third booking requests. The nodes 328a-328e constitute the first set of booking requests that is received at the first time instance "t=0 s". The nodes 330a and 330b represent the vehicles 108a and 108b, respectively. Each edge from the set of edges, such as the edges 332a, 332b, and 332c, has an associated multivariate vector. The edge 332a is generated between the nodes 328a and 330a, since the vehicle 108a may be utilized to offer a ride-sharing service to the customer 112a. The edge 332b is generated between the nodes 328c and 330b, since the vehicle 108b may be utilized to offer a ride-sharing service to the customer 112c. The edge 332c is generated between the nodes 328d and 330a, since the vehicle 108a may be utilized to offer a ride-sharing service to the customers 112a and 112b. The absence of an edge between a node from the first set of nodes 328 and a node from the second set of nodes 330 may be due a failure to satisfy profitability conditions, a failure to satisfy the set of one or more customer experience constraints, or an unavailability of any vehicle for offering vehicle or ride services to the one or more customers. Each edge from the set of edges, such as the edges 332a, 332b, and 332c, is associated with the multivariate vector. The multivariate vector may be represented in the format '<GMV, sharing-efficiency, dry run>'. The GMV for a vehicle (such as the vehicle 108a) may be defined as a total revenue generated by the vehicle by providing vehicle or ride services to the one or more customers (such as the set of customers 112) during the same trip. In the current embodiment, the GMV for the vehicle (such as the vehicle 108a) may be defined as a product of a cost of share-ride per unit distance and a sum of distances between pick-up and drop-off locations associated with the one or more customers (such as the set of customers 112), when the one or more customers experiences ride-sharing during the same trip. In additional embodiments, the GMV may be a function of multiple factors such as a type of share-ride, a vehicle type requested by each customer, a number of seats requested by each customer, a ride time, a degree of deviation from a route, or the like. In the current embodiment, GMV=(Cost of share-ride per unit distance)*(Sum of distances between pick-up and drop-off locations associated with the one or more customers).

Considering the edge 332c that represents a match between the node 328d, which represents the customers 112a and 112b, and the node 330a, which represents the vehicle 108a. For allocation of the vehicle 108a to the customers 112a and 112b, the GMV may be determined as GMV=(d3+d5)*(Cost of share-ride per unit distance). Let the cost of share-ride per unit distance is equal to 0.003 dollars per meter. Therefore, the GMV=(18000)*0.003=54 dollars.

Sharing efficiency, as described in the foregoing terms description, equals the total distance covered together by the customers 112a and 112b in the vehicle 108a, as a percentage of the distance covered by the vehicle 108a from the first pick-up location to a last drop-off location. With respect to the ongoing example, d8=7000 m, d9=3000 m, and d10=4000 m. Therefore, the sharing efficiency=(d5)/(d8+d9+d5+d10)=0.176.

Dry run, as described in the foregoing terms description, is a distance covered by the vehicle 108a without a single customer in the vehicle 108a post allocation of the vehicle 108a to a customer (such as the customer 112a or 112b). Therefore, the dry run=d2=2500 m. Therefore, the multivariate vector associated with the edge 332c is {54, 0.176, 2500}. Similarly, the multivariate vectors for the edges 332a and 332b may be determined. For example, the multivariate vectors for the edges 332a and 332b are equal to {45, 0, 2500} and {9, 0, 0}, respectively.

For each edge from the set of edges, such as the edges 332a, 332b, and 332c, the edge score may be determined. In the current embodiment, for a given multivariate vector, the edge score may be determined using equation (1):

$$\text{edge score} = \Sigma_i W_i * V_i \quad (1)$$

wherein,

'$W_i$' is a weight associated with an $i^{th}$ share-ride parameter included in the multivariate vector, and '$V_i$' is a parameter value of the $i^{th}$ share-ride parameter included in the multivariate vector.

In the current embodiment, let the weights associated with the GMV, sharing efficiency, dry run be '2', '10' and '−0.005', respectively. So, the edge scores for the edges 332a, 332b, and 332c are determined as 77.5, 18, and 97.26, respectively.

Figure 3D:
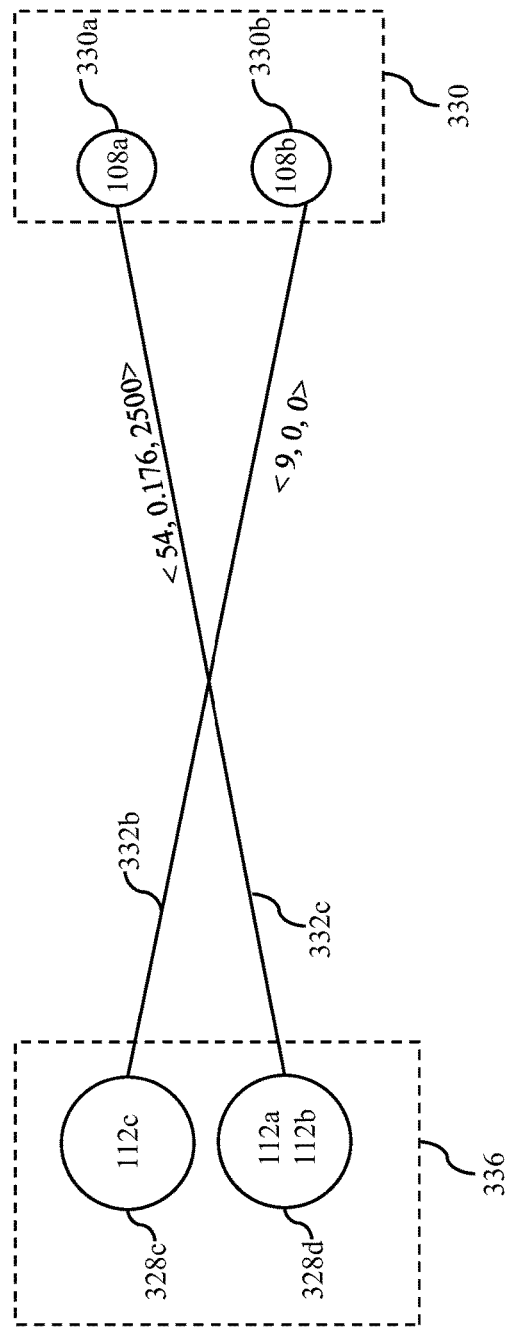

Referring now to FIG. 3D, an exemplary graph 334 illustrates a graph (i.e., the modified graph 334) generated by the graph generator 210 at the second time instance "t=10 s", to determine the allocation of the vehicles 108a and 108b to the set of customers 112, in accordance with the environment 300. The modified graph 334 includes a second set of booking requests, represented by a third set of nodes 336 (such as the nodes 328c and 328d). The second set of booking requests may be determined based on the first set of booking requests and a third set of booking requests. The third set of booking requests may be determined based on at least one of the historical booking data and the number of booking requests received after the first time instance. In the current exemplary scenario, assuming zero booking requests is received after the first time instance and zero booking requests is predicted based on the historical booking data, the third set of booking requests includes zero booking requests.

In FIG. 3C, the edges 332a and 332c share a common vertex (i.e., the node 330a). The graph generator 210 removes the edge 332a because the edge score (77.5) for the edge 332a is less than the edge score (97.26) for the edge 332c. Based on the removal of the edge 332a, the graph generator 210 obtains the modified graph 334 (as shown in FIG. 3D) such that no two edges share the common vertex. Based on the modified graph 334, the vehicle 108a is allocated to the customers 112a and 112b, and the vehicle 108b is allocated to the customer 112c on ride-sharing basis.

Figure 4A:
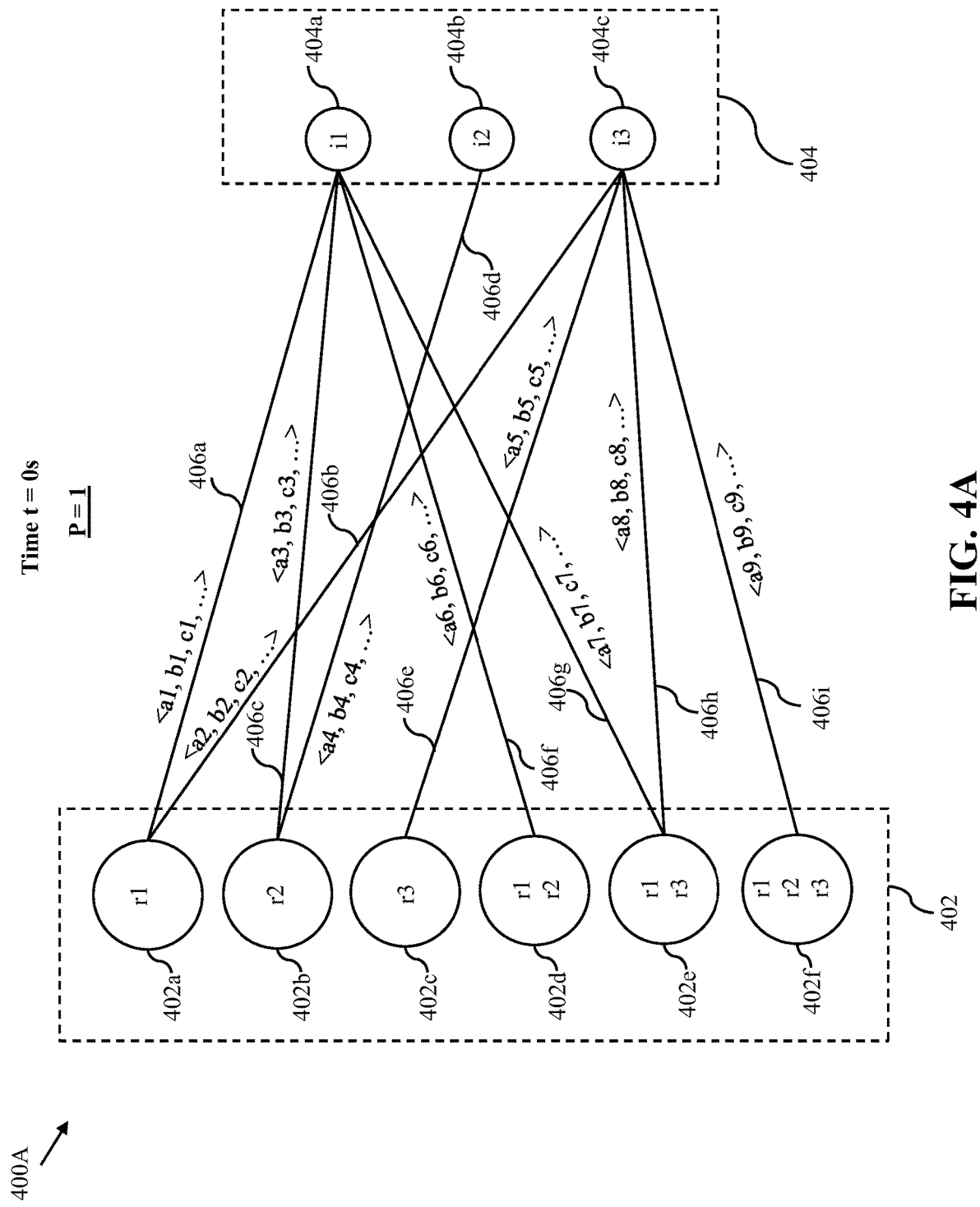
FIGS. 4A-4C, collectively, illustrate exemplary graphs for matching customers and vehicles for ride-sharing, in accordance with an embodiment of the present disclosure.
Figure 4B:
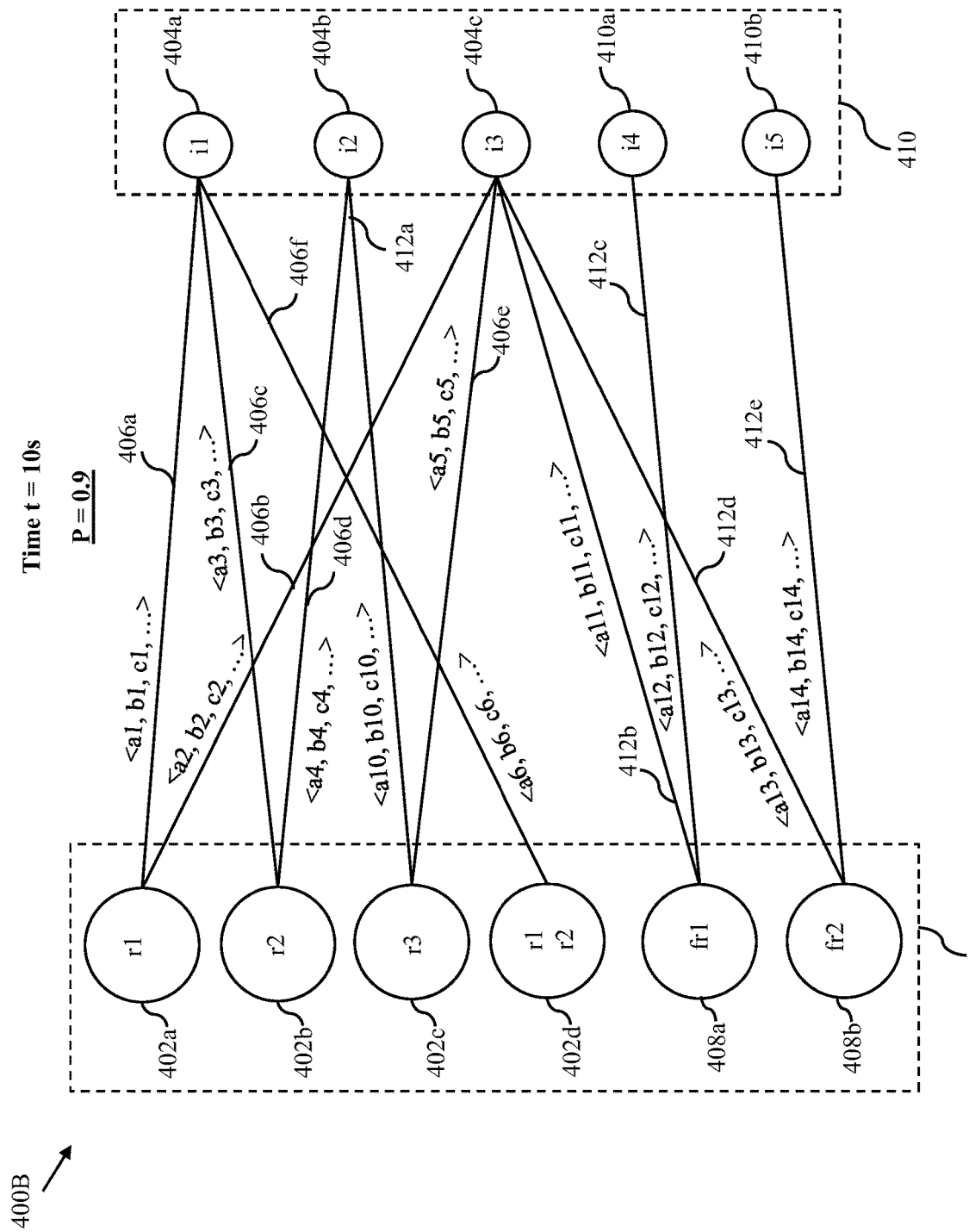
Figure 4C:
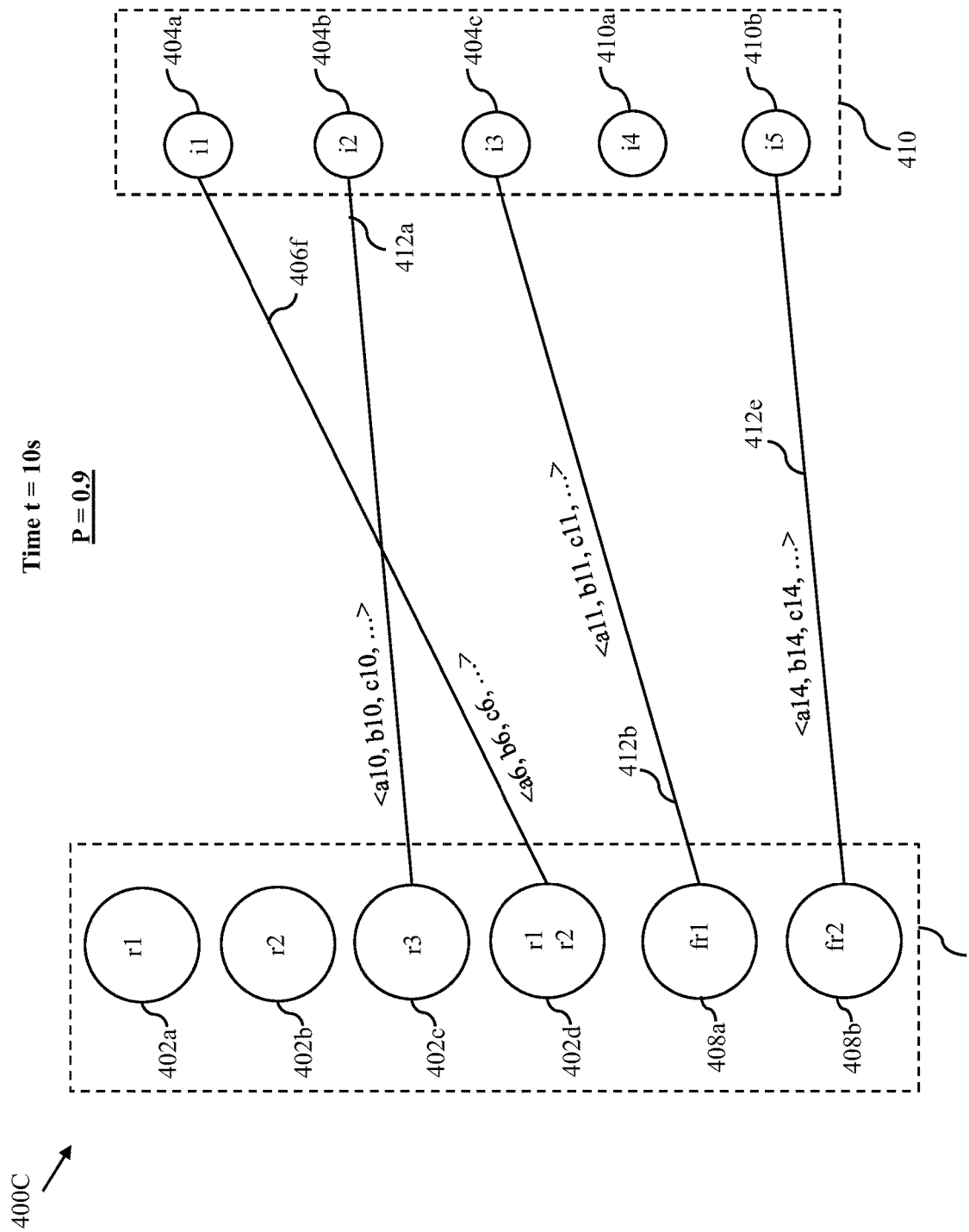

FIGS. 4A-4C, collectively, illustrate exemplary graphs for matching one or more customers and one or more vehicles for ride-sharing, in accordance with an embodiment of the present disclosure. FIG. 4A illustrates an exemplary graph 400A that is generated by the graph generator 210 at the first time instance "t=0 s". In an embodiment, the graph 400A includes a first set of nodes 402, a second set of nodes 404, and a set of edges (such as edges 406a-406i). Each node from the first set of nodes 402 represents one or more booking requests and each node from the second set of nodes 404 represents an available vehicle. Each edge from the set of edges, such as the edges 406a-406i, represents a matching between a node from the first set of nodes 402 and a node from the second set of nodes 404. In an embodiment, the nodes 402a, 402b, and 402c represent booking requests 'r1', 'r2', and 'r3', respectively. The nodes 402d and 402e represent a first combination of booking requests 'r1' and 'r2' and a second combination of booking requests 'r1' and 'r3', respectively. The node 402f represents a third combination of booking requests 'r1', 'r2', and 'r3'. Each combination of booking requests may be determined, by the graph generator 210, based on at least one of source locations, pick-up locations, destination locations, sharing efficiency, dry run, GMV, and a booking initiation time associated with each booking request.

In an embodiment, the nodes 404a, 404b, and 404c represent available vehicles 'i1', 'i2', and 'i3', respectively. The available vehicles may be identified or determined based on real-time allocation data including at least the current allocation status information and position information of each vehicle. The first set of nodes 402 represents the first set of booking requests such as the booking requests 'r1', 'r2', and 'r3', or any combination thereof, as shown in FIG. 4A. The second set of nodes 404 represents a set of available vehicles such as the available vehicles 'i1', 'i2', and 'i3'. Each edge represents a matching between a node from the first set of nodes 402 and a node from the second set of nodes 404. In one embodiment, an edge may be formed between the node from the first set of nodes 402 and the node from the second set of nodes 404, if an available vehicle (represented by the node from the second set of nodes 404) is available for providing ride-sharing services to the one or more customers (represented by the one or more nodes from the first set of nodes 402). In another embodiment, an edge may be formed between the node from the first set of nodes 402 and the node from the second set of nodes 404, if an available vehicle (represented by the node from the second set of nodes 404) is available for providing ride-sharing services to the one or more customers (represented by the one or more nodes from the first set of nodes 402) and can profitably provide ride-sharing services to the one or more customers, while satisfying the set of one or more customer experience constraints, such as 'pick-up within a certain time', 'deviation from a route below a certain threshold', or the like. In an embodiment, each edge is associated with a multivariate vector. The multivariate vector may be determined based on a set of parameter values corresponding to a set of share-ride parameters including the plurality of share-ride parameters, such as, but are not limited to, a degree of deviation from a route, a GMV, a sharing efficiency, a number of customers, a pick-up time, a measure of dry run, or a degree of customer satisfaction. For example, a multivariate vector associated with the edge 406a may be represented as <a1, b1, c1, . . . >, where a1, b1, c1, and so on are parameters values of share-ride parameters, such as, but are not limited to, a degree of deviation from a route, a GMV, a sharing efficiency, a number of customers, a pick-up time, a measure of dry run, or a degree of customer satisfaction. Similarly, a multivariate vector associated with the edge 406b may be represented as <a2, b2, c2, . . . >, a multivariate vector associated with the edge 406c may be represented as <a3, b3, c3, . . . >, a multivariate vector associated with the edge 406d may be represented as <a4, b4, c4, . . . >, and so on. The graph generator 210 may further determine the edge score for each edge (such as the edges 406a-406i) based on the multivariate vector of each edge and the weight associated with each share-ride parameter in the multivariate vector.

FIG. 4B illustrates an exemplary graph 400B that is generated by the graph generator 210 at the second time instance "t=10 s" (here, after 10 seconds of the first time instance "t=0 s"). The graph 400B includes a third set of nodes 408 and a fourth set of nodes 410. The third set of nodes 408 may be generated based on one or more previous nodes (such as the nodes 402a-402d) from the first set of nodes 402 and one or more new nodes (such as nodes 408a and 408b). The one or more previous nodes may be selected from the first set of nodes 402 based on at least the edge score associated with each edge of the graph 400A in FIG. 4A. For example, the nodes 402a-402d are selected from the first set of nodes 402 since the edge score of each edge associated with the nodes 402a-402d is greater than the edge score of each edge associated with the remaining nodes 402e and 402f. The nodes 408a and 408b may be determined based on at least the historical booking data. The historical booking data associated with the second time instance "t=10 s" may be processed to predict to one or more future booking requests, such as future booking requests 'fr1' and 'fr2'. The nodes 408a and 408b represent the future booking requests 'fr1' and 'fr2', respectively. The future booking requests 'fr1' and 'fr2' are associated with a probability factor "P=0.9" that indicates the probability of conversion of the predicted future booking requests 'fr1' and 'fr2' into actual booking requests in real-time.

In an embodiment, the fourth set of nodes 410 may be generated based on previous vehicles (such as the available vehicles and i3') that are available at the first time instance 't=0 s' and new vehicles (such as available vehicles 'i4' and 'i5') that are available at the second time instance 't=10 s'. Thus, the fourth set of nodes 410 includes the nodes 404a-404c and nodes 410a and 410b. Further, in an embodiment, each edge, such as the edges 406a-406f and edges 412a-412e, represents a matching between a node from the third set of nodes 408 and a node from the fourth set of nodes 410. The graph generator 210 may further determine the edge score for each new edge (such as the edges 412a-412i) based on a multivariate vector of each new edge and the weight associated with each share-ride parameter in the multivariate vector.

In an embodiment, the graph generator 210 may modify the graph 400B based on the edge score of each edge in the graph 400B and generate the modified graph (such as a graph 400C as shown in FIG. 4C) such that no two edges in the graph share a common vertex or node. The modified graph 400C may be generated based on the edge score of each edge in the graph 400B. For example, the edges 406a, 406c, and 406f share the same node 404a. However, the edge score for the edge 406f is greater than the edge score for each of the edges 406a and 406c. Thus, the edges 406a and 406c are removed and the edge 406f is retained in the modified graph 400C. Similarly, other edges in the graph 400B are processed to obtain the modified graph 400C. Further, in an embodiment, the vehicle allocation engine 214 may be configured to allocate the available vehicles (such as the vehicles 'i2', 'i3', 'i4', and 'i5') to the one or more customers associated with the booking requests 'r1', 'r2', 'fr1', and 'fr2', based on the modified graph 400C. For example, the vehicle 'i1' may be allocated to the customers associated with the booking requests 'r1' and 'r2', the vehicle 'i2' may be allocated to the customer associated with the booking request 'r3', the vehicle 'i3' may be allocated to the customer associated with the booking request 'fr1', and the vehicle 'i5' may be allocated to the customer associated with the booking request 'fr2'.

Thus, given multiple customers trying to book for ride-sharing with only limited available supply, the present disclosure facilitates the determination of the optimal assignment of the customers to the available vehicles in a way that the allocation maximizes the business objectives (such as GMV, sharing efficiency, or the like). This is a hard problem because it is computationally hard, and also it needs to factor in future gains from a share vehicle. This can then be compared to other point-to-point demand which is not share. This gives us the optimal predictable cost and also factors in the future demand. Further, given the supply locations (i.e., current and future availability of vehicles), demand (current and future demand), customer behavior (i.e., how long a customer is willing to wait for a vehicle), and various forms of allowed ride-sharing (such as point-to-point, along fixed route, or dynamic vehicle sharing), the objective of the present disclosure is to optimize the GMV and the sharing efficiency for each ride, while minimizing dry run, minimizing deviation, and reducing losses and ensuring customer's satisfaction for as many customers as possible. In order to achieve the objectives of the present disclosure, the demand from the customers may not allocated to the available vehicles immediately. Instead, the future demand and supply are predicted, and the time is determined when the estimated gain is maximum. The present disclosure uses a probabilistic decay function (based on customer's previous booking history) to estimate his drop off probability.

Figure 5:
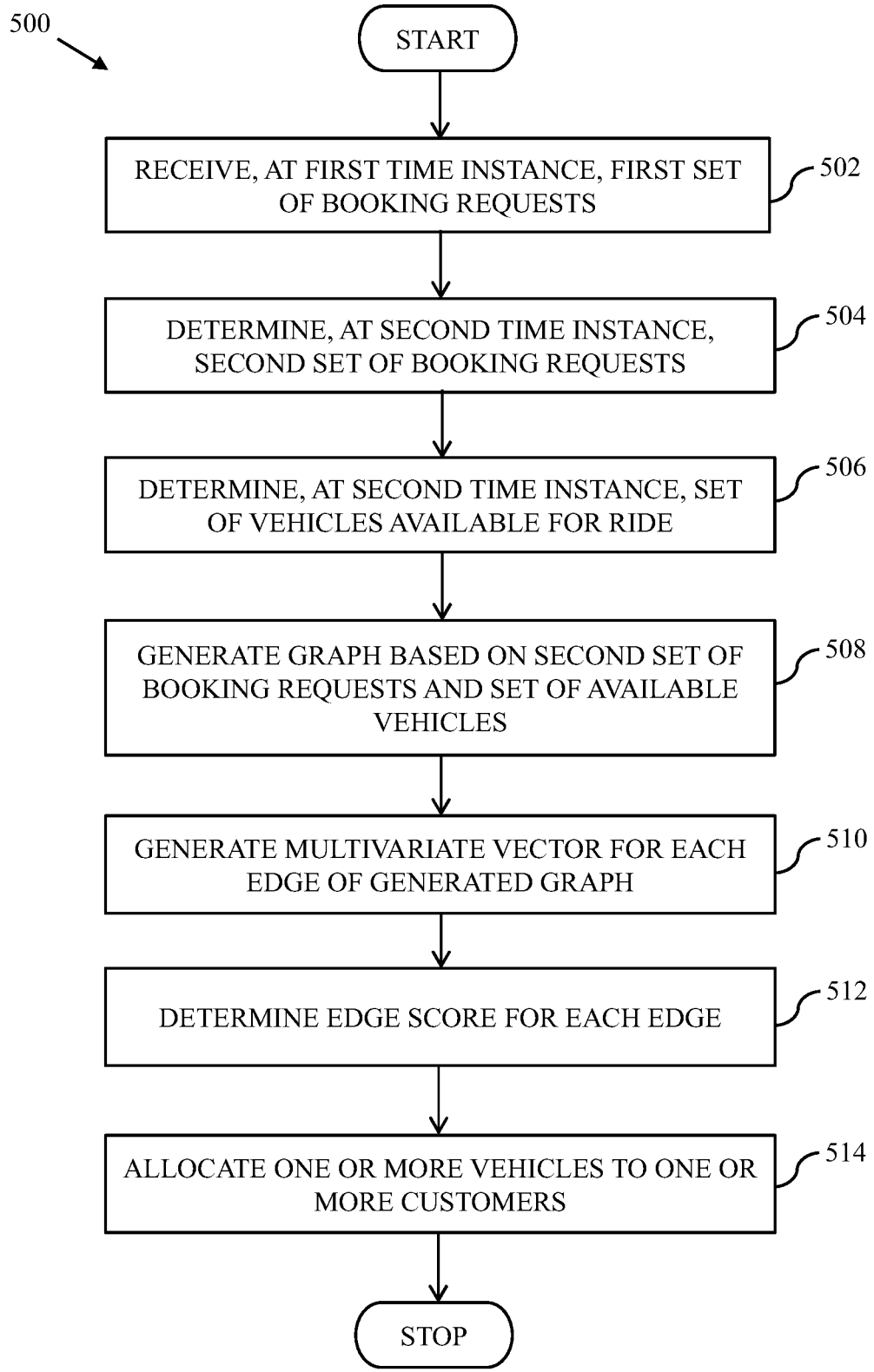
FIG. 5 is a flow chart that illustrates a method for allocating one or more vehicles to one or more customers for ride-sharing, in accordance with an embodiment of the present disclosure.

Referring now to FIG. 5, a flow chart 500 that illustrates a method for allocating one or more vehicles (such as the set of vehicles 108) to one or more customers (such as the set of customers 112) is shown, in accordance with an embodiment of the present disclosure.

At step 502, the first set of booking requests is received at the first time instance. In an embodiment, the transportation server 104 may be configured to receive, at a first time instance, the first set of booking requests for sharing one or more rides from the set of customer devices 110, such as the customer devices 110a, 110b, and 110c, of the set of customers 112, such as the customers 112a, 112b, and 112c. Each booking request may include at least the pick-up location, the drop-off location, and the customer profile of each customer. Each booking request may further include other ride-related preferences such as a preference for a vehicle type, a preference for a pick-up time, or a preference for a certain number of seats.

At step 504, the second set of booking requests is determined at the second time instance. In an embodiment, the transportation server 104 may be configured to determine, at the second time instance, the second set of booking requests including at least the first set of booking requests and the third set of booking requests. The third set of booking requests may be determined or predicted based on at least the historical booking data. The historical booking data may be associated with the second time instance. The third set of booking requests may be further determined based on the one or more booking requests that are received (from other customer devices) after the first time instance up to the second time instance.

At step 506, a set of vehicles available for the one or more rides is determined at the second time instance. In an embodiment, the transportation server 104 may be configured to determine, at the second time instance, the set of vehicles (such as the set of vehicles 108) that is available for allocation to the set of customers 112. The set of vehicles 108, such as the vehicles 108a, 108b, 108c, and 108d, may be determined or identified based on the real-time allocation data of each vehicle. The real-time allocation data is indicative of the current position information and the current allocation status of each vehicle.

At step 508, a graph is generated based on the second set of booking requests and the set of available vehicles (such as the set of vehicle 108). In an embodiment, the transportation server 104 may be configured to generate, at the second time instance, the graph (such as the graph 334 or 400C) based on the second set of booking requests and the set of vehicle 108. The generated graph includes a first set of nodes, a second set of nodes, and a set of edges. Each node in the first set of nodes represents at least one booking request from the second set of booking requests. Each node in the second set of nodes represents a vehicle from the set of vehicles 108. The set of edges includes one or more edges and each edge from the set of edges represents matching between first and second nodes from the first set of nodes and the second set of nodes, respectively, such that no two edges share the same node from the first set of nodes and the second set of nodes. The matching may be determined based on the plurality of share-ride parameters including at least the degree of deviation from a route associated with the first and second nodes and the sharing efficiency. The one or more share-ride parameters further include the GMV, the number of customers, the pick-up time, the measure of dry run, or the degree of customer satisfaction.

At step 510, the multivariate vector is generated for each edge of the generated graph. In an embodiment, the transportation server 104 may be configured to generate the multivariate vector for each edge of the generated graph based on the parameter value of each share-ride parameter associated with each edge.

At step 512, an edge score is determined for each edge. In an embodiment, the transportation server 104 may be configured to determine the edge score for each edge based on the multivariate vector and the weight associated with each share-ride parameter. The weight associated with each share-ride parameter may be set based on at least one of the geographical area or the time of day associated with each booking request. The edge score may be utilized, by the transportation server 104, to establish the optimal matching between nodes from the first set of nodes and the second set of nodes, such that no two edges share the same node from the first set of nodes and the second set of nodes. For example, if two edges share the same node, then one edge having the lower edge score in comparison to other edge is removed to obtain the optimal matching between the nodes.

At step 514, the one or more vehicles from the set of vehicles 108 are allocated to the one or more customers from the set of customers 112. In an embodiment, the transportation server 104 may be configured to allocate the one or more vehicles to the one or more customers based on the parameter value of each share-ride parameter associated with each edge. In an specific embodiment, the transportation server 104 may allocate the one or more vehicles to the one or more customers based on the edge score associated with each edge. More specifically, the transportation server 104 may allocate the one or more vehicles to the one or more customers based on the matching of nodes from the first set of nodes and the second set of nodes, respectively, such that no two edges share the same node from the first set of nodes and the second set of nodes. Based on the allocation, the transportation server 104 generates the allocation data and the direction information for each customer. The allocation data may include at least the driver information of a driver of the allocated vehicle, the vehicle information of the allocated vehicle, the fare information for ride-sharing, and the customer information of other customers, if any, who are sharing the allocated vehicle for the ride.

Figure 6:
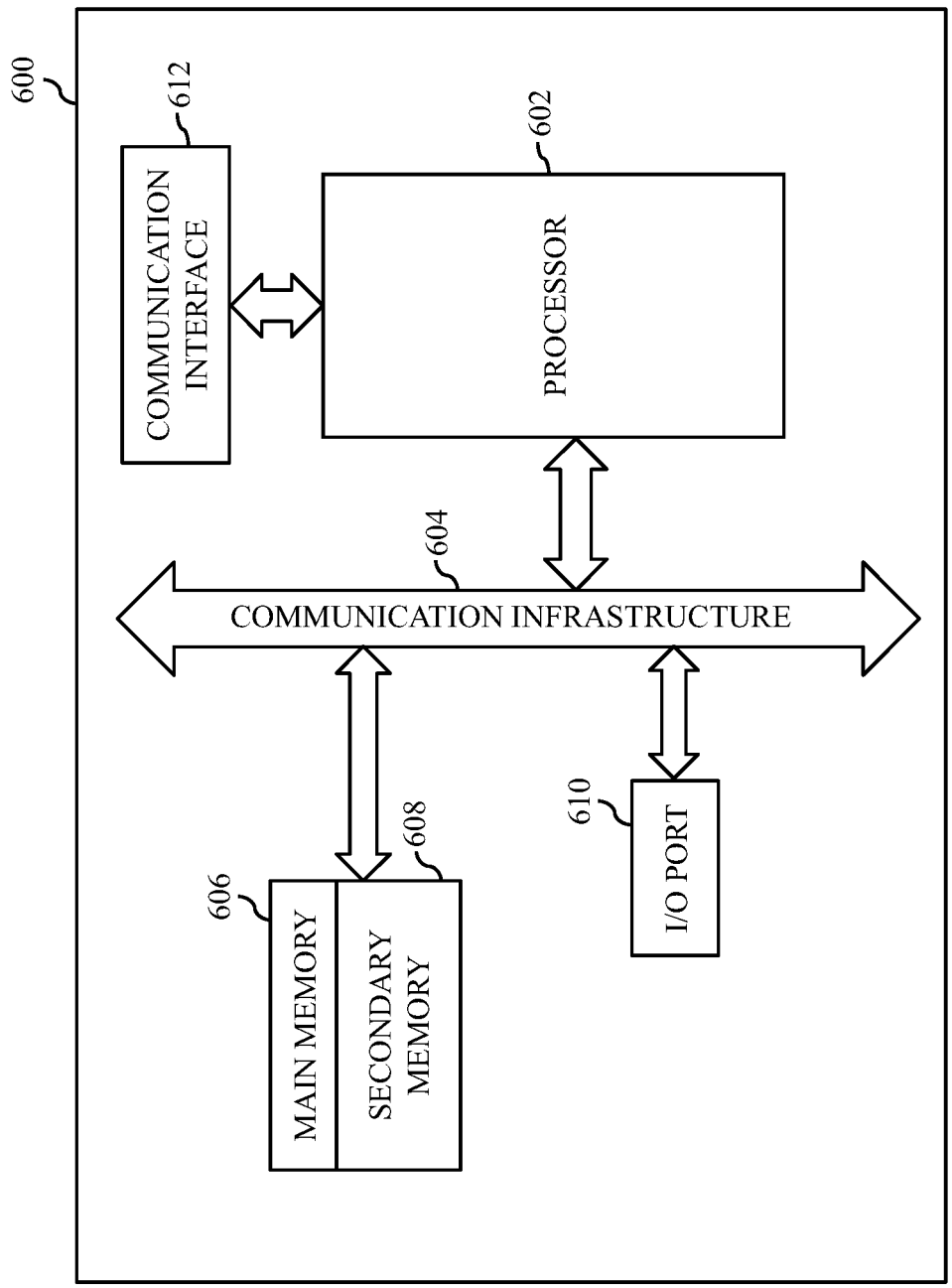
FIG. 6 is a block diagram that illustrates a computer system for allocating the one or more vehicles to the one or more customers for ride-sharing, in accordance with an embodiment of the present disclosure.

Referring now to FIG. 6, a block diagram that illustrates a computer system 600 for allocating the one or more vehicles (such as the vehicles 108a, 108b, 108c, and 108d) to the one or more customers (such as the customers 112a, 112b, and 112c) is shown, in accordance with an embodiment of the present disclosure. An embodiment of the present disclosure, or portions thereof, may be implemented as computer readable code on the computer system 600. In one example, the database server 102 and the transportation server 104 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the method of FIG. 5.

The computer system 600 includes a processor 602 that may be a special purpose or a general purpose processing device. The processor 602 may be a single processor, multiple processors, or combinations thereof. The processor 602 may have one or more processor "cores." Further, the processor 602 may be connected to a communication infrastructure 604, such as a bus, a bridge, a message queue, the communication network 114, multi-core message-passing scheme, and the like. The computer system 600 further includes a main memory 606 and a secondary memory 608. Examples of the main memory 606 may include RAM, ROM, and the like. The secondary memory 608 may include a hard disk drive or a removable storage drive (not shown), such as a floppy disk drive, a magnetic tape drive, a compact disc, an optical disk drive, a flash memory, and the like. Further, the removable storage drive may read from and/or write to a removable storage device in a manner known in the art. In an embodiment, the removable storage unit may be a non-transitory computer readable recording media.

The computer system 600 further includes an I/O port 610 and a communication interface 612. The I/O port 610 includes various input and output devices that are configured to communicate with the processor 602. Examples of the input devices may include a keyboard, a mouse, a joystick, a touchscreen, a microphone, and the like. Examples of the output devices may include a display screen, a speaker, headphones, and the like. The communication interface 612 may be configured to allow data to be transferred between the computer system 600 and various devices that are communicatively coupled to the computer system 600. Examples of the communication interface 612 may include a modem, a network interface, i.e., an Ethernet card, a communications port, and the like. Data transferred via the communication interface 612 may be signals, such as electronic, electromagnetic, optical, or other signals as will be apparent to a person skilled in the art. The signals may travel via a communications channel, such as the communication network 114 which may be configured to transmit the signals to the various devices that are communicatively coupled to the computer system 600. Examples of the communication channel may include, but are not limited to, cable, fiber optics, a phone line, a cellular phone link, a radio frequency link, a wireless link, and the like.

Computer program medium and computer usable medium may refer to memories, such as the main memory 606 and the secondary memory 608, which may be a semiconductor memory such as dynamic RAMs. These computer program mediums may provide data that enables the computer system 600 to implement the method illustrated in FIG. 5. In an embodiment, the present disclosure is implemented using a computer implemented application. The computer implemented application may be stored in a computer program product and loaded into the computer system 600 using the removable storage drive or the hard disc drive in the secondary memory 608, the I/O port 610, or the communication interface 612.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor, such as the processor 602, and a memory, such as the main memory 606 and the secondary memory 608, implement the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the present disclosure provide, among other features, systems and methods for allocating one or more vehicles to one or more customers. Unless stated otherwise, terms such as "first" and "second" are used to arbitrarily distinguish between the elements such terms describe. Thus, these terms are not necessarily intended to indicate temporal or other prioritization of such elements. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for facilitating ride-sharing, comprising:
receiving, by one or more processors, from a set of electronic devices, at a first time instance, a first set of booking requests, having pick-up locations within a geographical area, for sharing one or more rides, wherein the first set of booking requests is initiated based on a mobile application that runs on the set of electronic devices;
predicting, by the one or more processors, at a second time instance, one or more future booking requests, having pick-up locations within the geographical area, based on historical booking data associated with the second time instance, wherein the second time instance is after the first time instance;
determining, by the one or more processors, at the second time instance, a second set of booking requests including at least the received first set of booking requests and a third set of booking requests, wherein the third set of booking requests includes the one or more future booking requests;
tracking, by the one or more processors, current locations of a plurality of vehicles on a digital map based on real time location pings received from the plurality of vehicles over a communication network;

determining, by the one or more processors, at the second time instance, a set of vehicles, available for the one or more rides, from the plurality of vehicles, based on allocation data of the plurality of vehicles and current locations of the set of vehicles being tracked within the geographical area on the digital map;

generating, by the one or more processors, a graph comprising a first set of nodes and a second set of nodes, wherein each node in the first set of nodes represents at least one booking request from the second set of booking requests, wherein at least one node in the first set of nodes represents a future booking request of the one or more future booking requests, and wherein each node in the second set of nodes represents a vehicle from the set of vehicles;

forming, by the one or more processors, in the graph, a set of edges between the first set of nodes and the second set of nodes, wherein each edge from the set of edges represents matching between first and second nodes from the first set of nodes and the second set of nodes, respectively, and wherein the matching is determined based on a plurality of share-ride parameters comprising at least a degree of deviation from a route associated with the first and second nodes and a sharing efficiency;

modifying, by the one or more processors, the generated graph until no two edges from the set of edges share the same node from the first set of nodes and the second set of nodes;

allocating, by the one or more processors, a vehicle from the set of vehicles to two or more booking requests from the first set of booking requests for ride-sharing based on the modified graph and a parameter value of each share-ride parameter of the plurality of share-ride parameters associated with each edge from the set of edges; and controlling, by the one or more processors, a movement of the allocated vehicle along pick-up locations and drop-off locations of the two or more booking requests in accordance with the sharing efficiency of the allocated vehicle.

2. The method of claim 1, wherein each booking request comprises a corresponding drop-off location.

3. The method of claim 1, wherein the third set of booking requests further includes one or more booking requests received after the first time instance up to the second time instance.

4. The method of claim 1, wherein the plurality of share-ride parameters further comprises a gross merchandise value, a number of customers, a pick-up time, a measure of dry run, and a degree of customer satisfaction.

5. The method of claim 1, further comprising generating, by the one or more processors, a multivariate vector for each edge, wherein the multivariate vector includes the parameter value of each share-ride parameter of the plurality of share-ride parameters associated with each edge.

6. The method of claim 5, further comprising determining, by one or more processors, an edge score for each edge based on the multivariate vector and a weight associated with each share-ride parameter of the plurality of share-ride parameters associated with each edge.

7. The method of claim 6, wherein the weight associated with each share-ride parameter is set based on the geographical area and a time of a day associated with each booking request.

8. The method of claim 6, wherein the vehicle is further allocated to the two or more booking requests based on the edge score associated with each edge.

9. The method of claim 1, further comprising:
generating, by the one or more processors, after the allocation of the vehicle, direction information that controls the movement of the allocated vehicle between the pick-up locations and the drop-off locations of the two or more booking requests; and rendering, by the one or more processors, the digital map on a driver device of the allocated vehicle, wherein the digital map includes the generated direction information, and wherein the allocated vehicle navigates and moves between the pick-up locations and the drop-off locations of the two or more booking requests based on the generated direction information.

10. The method of claim 9, further comprising updating dynamically, by the one or more processors, the digital map rendered on the driver device based on real-time movement of the allocated vehicle.

11. A system for facilitating ride-sharing, comprising:
one or more processors configured to:
receive, from a set of electronic devices, at a first time instance, a first set of booking requests, having pick-up locations within a geographical area, for sharing one or more rides, wherein the first set of booking requests is initiated based on a mobile application that runs on the set of electronic devices;

predict, at a second time instance, one or more future booking requests, having pick-up locations within the geographical area, based on historical booking data associated with the second time instance, wherein the second time instance is after the first time instance;

determine, at the second time instance, a second set of booking requests including at least the received first set of booking requests and a third set of booking requests, wherein the third set of booking requests includes the one or more future booking requests;

track current locations of a plurality of vehicles on a digital map based on real time location pings received from the plurality of vehicles over a communication network;

determine, at the second time instance, a set of vehicles, available for the one or more rides, from the plurality of vehicles based on allocation data of the plurality of vehicles and current locations of the set of vehicles being tracked within the geographical area on the digital map;

generate a graph comprising a first set of nodes and a second set of nodes, wherein each node in the first set of nodes represents at least one booking request from the second set of booking requests, wherein at least one node in the first set of nodes represents a future booking request of the one or more future booking requests, and wherein each node in the second set of nodes represents a vehicle from the set of vehicles;

form, in the graph, a set of edges between the first set of nodes and the second set of nodes, wherein each edge from the set of edges represents matching between first and second nodes from the first set of nodes and the second set of nodes, respectively, and wherein the matching is determined based on a plurality of share-ride parameters comprising at least a degree of deviation from a route associated with the first and second nodes and a sharing efficiency;

modify the generated graph until no two edges from the set of edges share the same node from the first set of nodes and the second set of nodes;

allocate a vehicle from the set of vehicles to two or more booking requests from the first set of booking requests to ride-share based on the modified graph and a parameter value of each share-ride parameter of the plurality of share-ride parameters associated with each edge from the set of edges; and control a movement of the allocated vehicle along pick-up locations and drop-off locations of the two or more booking requests in accordance with the sharing efficiency of the allocated vehicle.

12. The system of claim 11, wherein each booking request comprises a corresponding drop-off location.

13. The system of claim 11, wherein the third set of booking requests further includes one or more booking requests received after the first time instance up to the second time instance.

14. The system of claim 11, wherein the plurality of share-ride parameters further comprises a gross merchandise value, a number of customers, a pick-up time, a measure of dry run, and a degree of customer satisfaction.

15. The system of claim 11, wherein the one or more processors are further configured to generate a multivariate vector for each, wherein the multivariate vector includes the parameter value of each share-ride parameter of the plurality of share-ride parameters associated with each edge.

16. The system of claim 15, wherein the one or more processors are further configured to determine an edge score for each edge based on the multivariate vector and a weight associated with each share-ride parameter of the plurality of share-ride parameters associated with each edge.

17. The system of claim 16, wherein the one or more processors are further configured to set the weight associated with each share-ride parameter based on the geographical area and a time of a day associated with each booking request.

18. The system of claim 16, wherein the one or more processors are further configured to allocate the vehicle to the one or more booking requests based on the edge score associated with each edge.

* * * * *